(12) United States Patent
Yanase

(10) Patent No.: US 10,046,332 B2
(45) Date of Patent: Aug. 14, 2018

(54) RECYCLED AGGREGATE MANUFACTURING METHOD AND RECYCLED AGGREGATE OBTAINED FROM SAID METHOD

(75) Inventor: Shigeo Yanase, Kisarazu (JP)

(73) Assignee: Daito Dobuko Ltd., Chiba (JP)

( * ) Notice: Subject to any disclaimer, the term of this patent is extended or adjusted under 35 U.S.C. 154(b) by 911 days.

(21) Appl. No.: 14/375,727

(22) PCT Filed: Jan. 30, 2012

(86) PCT No.: PCT/JP2012/051950
§ 371 (c)(1),
(2), (4) Date: Apr. 23, 2015

(87) PCT Pub. No.: WO2013/114526
PCT Pub. Date: Aug. 8, 2013

(65) Prior Publication Data
US 2015/0218050 A1 Aug. 6, 2015

(51) Int. Cl.
*B02C 23/00* (2006.01)
*B02C 23/14* (2006.01)
*C04B 18/16* (2006.01)

(52) U.S. Cl.
CPC .......... *B02C 23/14* (2013.01); *C04B 18/167* (2013.01); *Y02W 30/95* (2015.05)

(58) Field of Classification Search
CPC ..... B02C 23/14; C04B 18/167; C04B 20/026; Y02W 30/95
See application file for complete search history.

(56) References Cited

U.S. PATENT DOCUMENTS 4,245,999 A * 1/1981 Reiniger ............... B02C 13/14
209/17
8,267,337 B2 * 9/2012 Webb .................. B02C 13/18
241/154
8,459,581 B2 * 6/2013 Bai ..................... C10L 5/06
241/78

(Continued)

FOREIGN PATENT DOCUMENTS

| JP | 2006111523 | 4/2006 |
| JP | 2008266109 | 11/2008 |
| JP | 2010163337 | 7/2010 |

OTHER PUBLICATIONS

International Search Report for International Application No. PCT/JP2012/051950 dated May 22, 2012.

*Primary Examiner* — Faye Francis
(74) *Attorney, Agent, or Firm* — Greenberg Traurig, LLP; Chinh H. Pham; Todd C. Basile

(57) ABSTRACT

Provided is a method for manufacturing high quality recycled aggregate by using concrete debris as raw material including: crushing a raw material including concrete debris; classifying the crushed raw material into small diameter components and large diameter components; supplying the components to a mill with a volume ratio of the large diameter components relative to the small diameter components equal or greater and rubbing the components with each other at the mill, the mill not including a milling medium; reprocessing the components in the mill at least once or more; and collecting the reprocessed components as recycled aggregate.

7 Claims, 17 Drawing Sheets

(56) References Cited

U.S. PATENT DOCUMENTS

| | | | | |
|---|---|---|---|---|
| 8,579,997 B2* | 11/2013 | Bai | ............................ | C10L 5/06 |
| | | | | 44/589 |
| 8,695,903 B2* | 4/2014 | Gillis | ........................ | C22B 7/005 |
| | | | | 241/24.14 |
| 2012/0085263 A1* | 4/2012 | Guynn | ...................... | B02C 21/00 |
| | | | | 106/606 |

* cited by examiner (a)

(b)

(a)

(b)

RECYCLED AGGREGATE MANUFACTURING METHOD AND RECYCLED AGGREGATE OBTAINED FROM SAID METHOD

CROSS-REFERENCE TO RELATED APPLICATIONS

This application is a National Phase application of International Application No. PCT/JP2012/051950, filed Jan. 30, 2012, the contents of which are incorporated by reference herein in their entirety.

TECHNICAL FIELD

The present invention relates to a method for manufacturing high quality recycled aggregate from concrete debris and recycled aggregate obtained by the same.

BACKGROUND OF THE INVENTION

Conventionally, most of the recycled aggregate manufactured using concrete mass, which is generated as a result of demolition of a concrete structure, as raw material has been reused as roadbed material for paving a road.

However, since demand for roadbed material for paving a road has decreased due to remarkable reduction of the amount of road buildings in recent years, and it is predicted that recycled aggregate will be excessive in the near future, effort for reusing the above-described recycled aggregate as recycled aggregate for concrete has been made.

JIS A 5021 is defined as a standard of recycled aggregate for concrete. According to this standard, recycled aggregate is classified into H, M, and L.

Among these, "recycled aggregate H" is recycled aggregate for concrete which is manufactured by performing advanced processing of crushing, milling, classifying, etc. on the concrete generated as a result of demolition of a concrete structure or the like. The "recycled aggregate H" is high quality aggregate, which can be treated substantially in the same manner as ordinary aggregate and can be used for any part of a building.

However, in reality, a method for collecting high quality recycled aggregate corresponding to the "recycled aggregate H" from concrete debris is not fully established yet.

In view of this reality, the present inventors propose an invention relating to a method for controlling the quality of recycled aggregate for concrete in The following Patent Document 1.

When a mechanical polishing apparatus, in which a partition member forming a plurality of milling chambers is provided at rotating shaft in a drum body and stuffing is stuffed in the milling chambers, is used, this invention is a manufacturing method with the number of rotations of the partition member divided by the amount of raw material input being set as variable R, recycled coarse aggregate being in a range of the variable R between 0.67 and 1.88 and recycled fine aggregate being in a range of the variable R between 1.00 and 4.67 (however, when quality is assessed in view of absolute dry density and water absorption).

The present inventors referred to the knowledge acquired by the above-described invention, further researched a method for manufacturing high quality recycled aggregate, in particular, recycled aggregate H stipulated in JIS A 5021, and has achieved the present invention.

THE PRIOR ART DOCUMENT

Patent Document

The Patent Document 1: Japanese Patent Publication No. 2010-163337.

SUMMARY OF THE INVENTION

Problem(s) to be Solved by the Invention

The present invention is to provide a method for manufacturing high quality recycled aggregate using concrete debris made of: concrete mass generated as a result of demolition of a concrete structure; and/or returned ready-mixed concrete which is manufactured at a ready-mixed concrete plant and returns from a concrete placing site, etc. as raw material.

Means for Solving the Problem(s)

The invention according to one aspect provides, as means for solving the above-described problems: a method for manufacturing recycled aggregate, comprising: a crush step for crushing a raw material including concrete debris so as to have a predetermined particle diameter or smaller; a first classification step for classifying the raw material crushed in the crush step into components of small diameter (hereinafter, referred to as "small diameter components") each having a first standard particle diameter or smaller and components of large diameter (hereinafter, referred to as "large diameter components") each having the first standard particle diameter or greater; a milling step for supplying the large diameter components and the small diameter components classified in the first classification step to a mill with a volume ratio of the large diameter components relative to the small diameter components equal or greater and rubbing the large diameter components and the small diameter components with each other at the mill, the mill not including a milling medium; a second classification step for classifying the large diameter components and the small diameter components milled in the milling step into small diameter components each having a second standard particle diameter or smaller and large diameter components each having the second standard particle diameter or greater, the second standard particle being smaller than the first standard particle diameter; and a reprocessing step for supplying the large diameter components and the small diameter components classified in the second classification step to the mill and sequentially performing the milling step and the second classification step, wherein after the reprocessing step is performed at least once or more, the large diameter components and the small diameter components classified in the second classification step in a last-performed reprocessing step are collected as recycled aggregate.

The invention according to another aspect provides: a method for manufacturing recycled aggregate, comprising: a crush step for crushing a raw material including concrete debris so as to have a predetermined particle diameter or smaller; a first classification step for classifying the raw material crushed in the crush step into small diameter components having a first standard particle diameter or smaller and large diameter components having the first standard particle diameter or greater; a first milling step for supplying the large diameter components and the small diameter components classified in the first classification step to a first mill with a volume ratio of the large diameter components relative to the small diameter components equal or greater and rubbing the large diameter components and the small diameter components with each other at the first mill, the first mill not including a milling medium; a second classification step for classifying the large diameter components and the small diameter components milled in the first milling step into small diameter components having a second standard particle diameter or smaller and large diameter components having the second standard particle diameter or greater, the second standard particle diameter being smaller than the first standard particle diameter; a second milling step for supplying the small diameter components classified in the second classification step to a second mill and rubbing the small diameter components each other at the second mill, the second mill not including a milling medium; and a reprocessing step for supplying the large diameter components classified in the second classification step and the small diameter components milled in the second milling step to the first mill and sequentially performing the first milling step, the second classification step, and the second milling step, wherein after the reprocessing step is performed at least once or more, the large diameter components classified in the second classification step and the small components milled in the second milling step in a last-performed reprocessing step are collected as recycled aggregate.

The invention according to yet another aspect provides: a method for manufacturing recycled aggregate described above, wherein the raw material includes: a first raw material generated as a result of demolition of a concrete structure; and a second raw material made of returned ready-mixed concrete, and a ratio (volume ratio) of the second raw material to the entire raw material is set at 30% or greater.

The invention according to yet another aspect provides: a method for manufacturing recycled aggregate described above, wherein the reprocessing step is performed at least twice or more.

The invention according to yet another aspect provides: recycled aggregate obtained by a manufactured method described above, wherein the recycled aggregate has absolute dry density of 2.5 g/cm$^3$ or greater and water absorption of 3.0% or smaller.

Effect of the Invention

According to the invention of claim 1, since the relatively large raw material classified on the basis of the first standard particle diameter greater than the second standard particle diameter is provided to the milling step, excessive size reduction of the raw material can be prevented by undergoing the milling step, and decrease of the number of the large diameter components can be suppressed. Thus, the small diameter components and the large diameter components can be collected with well-balanced ratio.

In addition, since the small diameter components are rubbed with the large diameter components with the volume of the large diameter components equal to or greater than that of the small diameter components in the mill without a milling medium (steel ball, etc.), the large diameter components function as the milling medium to more certainly rub off the cement paste adhering to the surface of the small diameter components, and thus the raw material is not excessively milled by collision with a high hardness milling medium (steel ball, etc.). Moreover, since the reprocessing step is performed at least once or more, high quality recycled aggregate for concrete from which cement paste has been certainly removed can be obtained.

According to the invention of claim 2, in addition to the effect of the invention of claim 1, since the second milling step for supplying the small diameter components classified in the second classification step to the second mill and rubbing them thereat is provided, the cement paste adhering to the surface of the small diameter components classified in the second classification step is certainly removed, and thus higher quality recycled aggregate for concrete can be obtained.

According to the invention of claim 3, since the raw material includes: the first raw material (sandstone based raw material) generated as a result of demolition of a concrete structure; and the second raw material made of returned ready-mixed concrete (lime based raw material), and a ratio (volume ratio) of the second raw material to the entire raw material is set at 30% or greater, high quality recycled aggregate for concrete which is determined harmless in an alkali silica reactivity test can be certainly obtained.

According to the invention of claim 4, since the reprocessing step is performed at least twice or more, the cement paste adhering to the surface is certainly removed, and thus higher quality recycled aggregate for concrete can be obtained.

According to the invention of claim 5, since the recycled aggregate is obtained by the manufacturing method according to any one of claims 1 to 4 and has absolute dry density of 2.5 g/cm$^3$ or greater and water absorption of 3.0% or smaller, it is regarded as high quality recycled aggregate which can be treated substantially in the same manner as ordinary aggregate satisfying the conditions for recycled aggregate H stipulated in JIS A 5021.

BRIEF DESCRIPTION OF THE DRAWINGS

FIG. 4(a) is a plan view thereof, and FIG. 4(b) is a cross sectional view thereof taken along line IIb-IIb.

FIG. 5(a) is a plan view thereof, FIG. 5(b) is a side view thereof, FIG. 5(c) is a sectional view thereof taken along line IIIc-IIIc, and FIG. 5(d) is a perspective view thereof.

FIG. 9(a) is a perspective view of one pressure-receiving member, and FIG. 9(b) is a perspective view of two pressure-receiving members combined.

10(a) is a perspective view of one pressure-receiving member, and FIG. 10(b) is a perspective view of two pressure-receiving members combined.

FIG. 11(a) is a perspective view of one pressure-receiving member, and FIG. 11(b) is a perspective view of two pressure-receiving members combined.

FIG. 16(a) is a sectional view thereof, and on the right side of FIG. 16(b) is shown a cross sectional view of FIG. 16(a) taken along line A-A, and on the left side of FIG. 16(b) is shown a cross sectional view of FIG. 16(a) taken along line B-B.

FIG. 17(a) is a perspective view thereof, and FIG. 17(b) is a cross sectional view thereof.

FIG. 18(a) shows a state in which the area of the discharge spout is large, and FIG. 18(b) shows a state in which the area of the discharge spout is small.

DETAILED DESCRIPTION OF THE INVENTION

Hereinafter, preferable embodiments of a method for manufacturing recycled aggregate and recycled aggregate obtained by the method according to the present invention will be described with reference to the drawings as appropriate.

Figure 1:
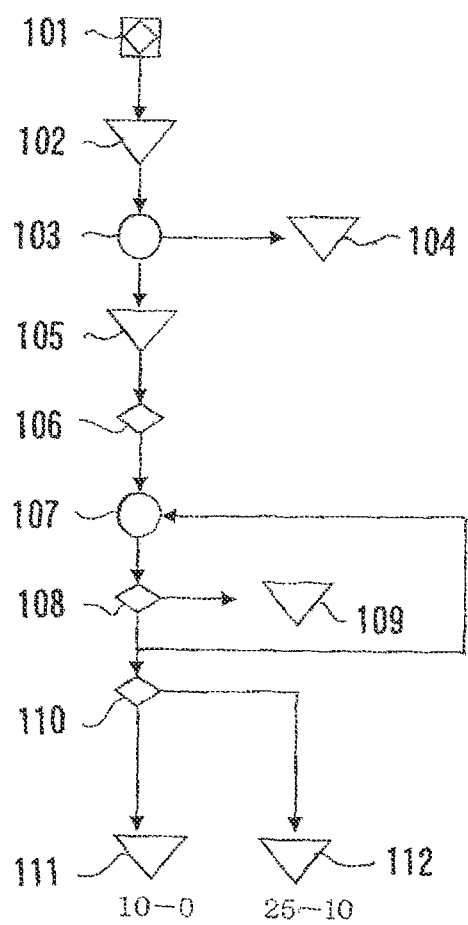
FIG. 1 is a flow chart showing a method (pre-processing step) for manufacturing recycled aggregate according to the present invention.
Figure 2:
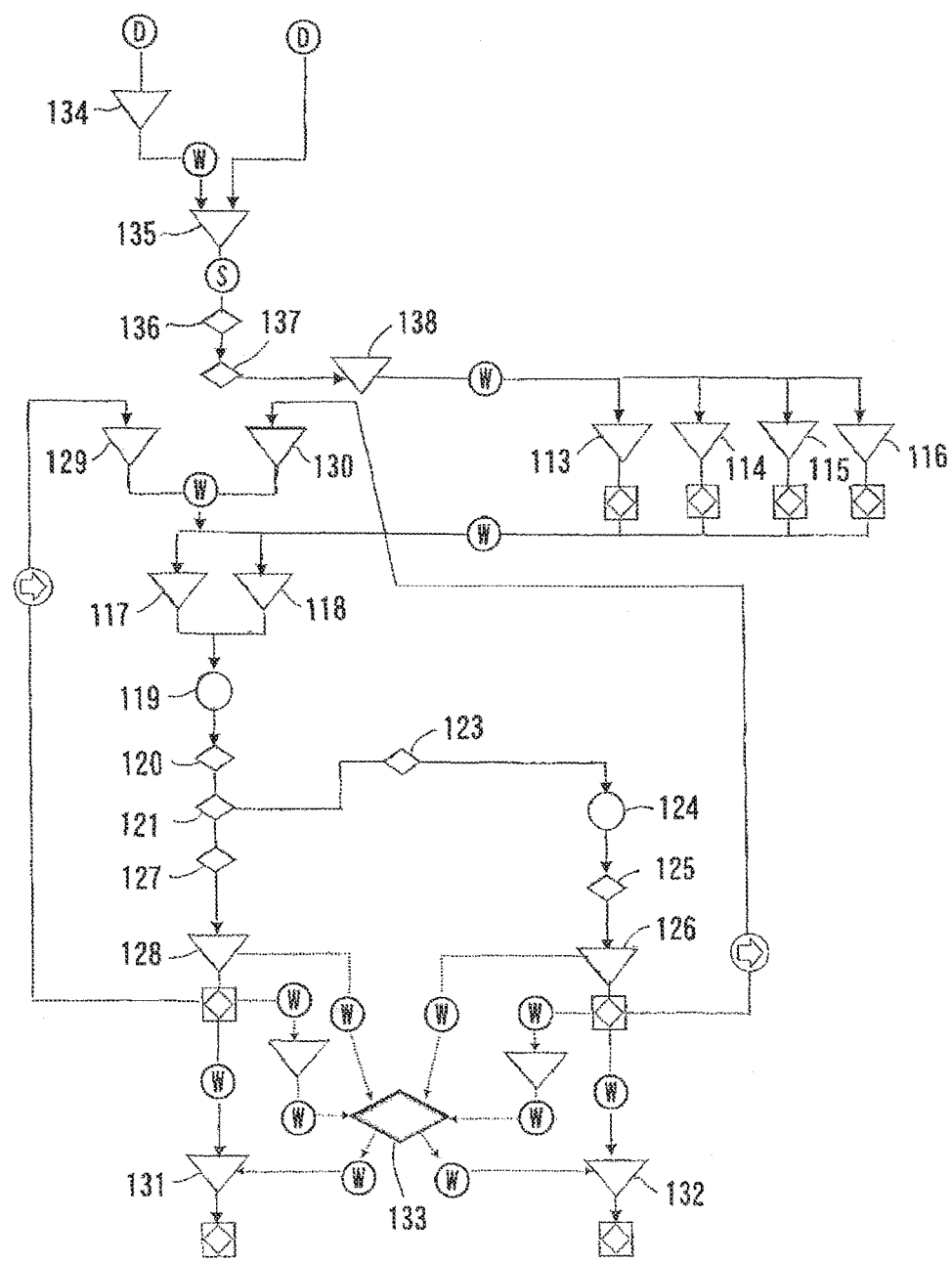
FIG. 2 is a flow chart showing a method (post-processing step) for manufacturing recycled aggregate according to the present invention.

FIG. 1 and FIG. 2 are flow charts each showing a method for manufacturing recycled aggregate according to the present invention. FIG. 1 is a drawing showing a pre-processing step, and FIG. 2 is a drawing showing a post-processing step. It is noted that in FIG. 2, (W) shows transfer by a wheel loader, (D) shows transfer by a dump truck, and (5) shows transfer by a power shovel. In addition, the signs in FIG. 2 having the same sign as in FIG. 1 denoted by reference numeral (101) indicate an inspection step.

First, the pre-processing step shown in FIG. 1 is described.

Raw material used in the present invention is concrete debris.

Specifically, a sandstone based raw material of concrete mass which is generated as a result of demolition of a concrete structure (building, etc.) or the like; and/or a lime based raw material of returned ready-mixed concrete which is manufactured at a ready-mixed concrete plant and returns from a concrete placing site or the like are used as concrete debris. In the present invention, only the sandstone based raw material may be used, only the lime based raw material may be used, or both of them may be used. However, it is preferable that the ratio (volume ratio) of the lime based raw material to the entire raw material is set at 30% or greater, as will be later described.

In the pre-processing step, after the receiving inspection (101) is performed on a raw material(s) (raw concrete) made of concrete debris carried in from a construction site, a ready-mixed concrete plant, a concrete product factory, etc., the raw material(s) which has passed the inspection is accommodated in a hopper (102).

The raw material(s) accommodated in the hopper (102) is the sandstone based raw material and/or lime based raw material described above. When both of the sandstone based raw material and the lime based raw material are used, a step for processing the sandstone based raw material and a step for processing the lime based raw material are performed separately in the pre-processing step (FIG. 1). That is, the pre-processing step is performed twice.

In the receiving inspection (101), it is determined whether the raw material satisfies the four items of "stone characteristics and impurity amount: within the limit of boundary sample", "absolute dry density: 2.5 g/cm$^3$ or greater", "water absorption: 3.0% or smaller" and "alkali silica reactivity: harmless (A)".

As for the raw material(s) stored in the hopper (102), reinforcing bar thereof is removed by a foreign matter removal device (103) with a magnet, and the removed reinforcing bar is stored at a reinforcing bar yard (104).

After the raw material(s) from which the reinforcing bar has been removed is accommodated in a an ore hopper (105), the raw material(s) is supplied to a classifier (vibrating sieve) (106). Only the raw material(s) each having a size of 60 mm or smaller which has passed a sieve mesh of the classifier (vibrating sieve) (106) is supplied to a crushing device (107), and a crush step is performed thereon.

Although the kinds of the crushing device (107) are not particularly limited, Bardopact (product name: made by Nittetsu Mining Co., Ltd.) is suitably used, for example.

During the crush step, the raw material(s) is crushed to have a predetermined particle diameter (25 mm) or smaller by the crushing device (107).

As for the raw material(s) crushed by the crushing device (107), reinforcing bar thereof is removed by a magnetic separator (108), and the removed reinforcing bar is stored at a reinforcing bar yard (109).

The raw material, which has been crushed to have the predetermined particle diameter or smaller during the crush step and from which the reinforcing bar has been removed by the magnetic separator (108), is supplied to a classifier (vibrating sieve) (110).

At the classifier (vibrating sieve) (110), the raw material crushed to have a size of 25 mm or smaller during the crush step is classified into small diameter components (111) each having a first standard particle diameter (10 mm) or smaller and large diameter components (112) each having the first standard particle diameter (10 mm) or greater (first classification step). It is noted that a raw material(s) which exceeds a size of 25 mm is sorted out in the first classification step, and it is again supplied to and crushed by the crushing device (107).

By the above-described steps, the small diameter components (111) each having a particle diameter of 0-10 mm and the large diameter components (112) each having a particle diameter of 10-25 mm are obtained.

Next, the post-processing step shown in FIG. 2 is described.

The small diameter components (111) and the large diameter components (112) obtained in the pre-processing step described above are provided to the post-processing step in a sequential manner.

Herein, when both of the sandstone based raw material and the lime based raw material are used, a total of four kinds of raw materials are provided to the post-processing step since the small diameter components (111) and the large diameter components (112) respectively include the sandstone based raw material and the lime based raw material. When either the sandstone based raw material or the lime based raw material is used, two kinds of raw materials are provided to the post-processing step since the small diameter components (111) and the large diameter components (112) only include either the sandstone based raw material or the lime based raw material.

Two kinds or four kinds of raw materials are sequentially provided to the post-processing step in a separate manner. The order of providing is not particularly limited.

[Manufacturing Method 1 (when Four Kinds of Raw Materials are Used)]

Hereinafter, the case where four kinds of raw materials are used will be described.

The four kinds of raw materials include: large diameter components (112A) each having a size of 10-25 mm of the sandstone based raw material; large diameter components (112B) each having a size of 10-25 mm of the lime based raw material; small diameter components (111A) each having a size of 0-10 mm of the sandstone based raw material; and small diameter components (111B) each having a size of 0-10 mm of the lime based raw material. The four kinds of raw materials are sequentially provided to the post-processing step in a separate manner, as described above.

Herein, the ratio among the components to be provided to the post-processing step is set such that the volume of the large diameter components is equal to or greater than the volume of the small diameter components. The ratio (volume) of the large diameter components to the entire raw material is preferably set at 50% or greater, and more preferably set between 50 and 70%. The reason thereof is because when the ratio of the large diameter components is 50% or greater, "the function of the large diameter components rubbing off the cement paste adhering to the surface of the small diameter components", which will be described later, is fully exhibited. Thus, higher quality recycled aggregate can be collected.

The large diameter components (112A) and (112B) are provided to a treatment (135) before water-washing via a temporary yard (134). The small diameter components (111A) and (111B) are directly provided to the treatment (135) before water-washing. These four components are sequentially provided to the treatment (135) before water-washing in a separate manner.

In a separate and sequential manner, mud is removed at the vibrating sieve (136) from the four components on which the treatment (135) before water-washing has been performed, and the four components are water-washed at a spiral washer (137), dewatered at a raw aggregate yard (138) after water-washing, and then accommodated in four hoppers (113, 114, 115, 116), respectively. In the illustrated example, the small diameter components (111A) of the sandstone based raw material is accommodated in the hopper (116), the large diameter components (112A) of the sandstone based raw material is accommodated in the hopper (113), the small diameter components (111B) of the lime based raw material are accommodated in the hopper (115), and the large diameter components of the lime based raw material (112B) are accommodated in the hopper (114).

Since the following steps roughly include three separate steps. These steps are referred to as post-processing step 1, post-processing step 2, and post-processing step 3 in order of step.

<Post-Processing Step 1>

The above-described four kinds of components are sequentially provided to a first mill (119) (corresponding to the mill defined in claim 1 and the first mill defined in claim 2) in a separate manner through a first entrance port (117) and a second entrance port (118), respectively.

At the first mill (119), a first milling step (corresponding to the milling step defined in claim 1 and the first milling step defined in claim 2) for rubbing the supplied components with each other is performed.

A mill which does not include a milling medium (ball, rod, etc.) is used as the first mill (119). Specifically, a mill includes: a cylindrical drum body configured such that a material(s) to be milled (hereinafter, referred to as "to-be-milled material(s)") taken in from one part thereof can be discharged from the other part thereof; a central shaft penetrating the drum body in the cylinder lengthwise direction thereof; and a plurality of milling plates which are attached to the drum body at predetermined spacing in the axial direction of the central shaft and which partitions the internal space of the drum body into a plurality of milling chambers. The mill, in which at least one of the drum body and the milling plates rotates and which does not include a milling medium (steel ball, etc.) for milling a to-be-milled material(s) by coming into contact with the to-be-milled material(s) while rolling in the drum body, is suitably used. However, the first mill (119) is not limited to the one with such a structure.

An example(s) of the detailed configuration of the first mill (119) will be described later.

In the present invention, since a mill which does not include a milling medium is used as the first mill (119) in the first milling step (corresponding to the milling step defined in claim 1 and the first milling step defined in claim 2), a raw material(s) does not collide with the milling medium (steel ball, etc.) so as to be prevented from being milled by the milling medium. Thus, rubbing effect among materials certainly occurs in the mill, and the cement paste adhering to the surface of the material(s) is removed without overmilling the materials. Therefore, high quality recycled aggregate for concrete can be obtained.

The surface of a raw material(s) is rubbed off during the first milling step. As a result, the number of components each having a size of 20 mm or greater decreases. Although the particle diameter of the large diameter components is referred to as 5-20 mm in the following description, the large diameter components may include components each having a size of 20 mm or greater. However, the number of components each having a size of 20 mm or greater will be reduced to zero by performing the processing by the first mill (119) twice or more.

In the present invention, preconsidering the reduction of the size of the particle diameter during the milling process, the upper limit (25 mm) of the particle diameter of the large diameter components to be provided to the post-processing step is set slightly larger than the upper limit (20 mm) demanded for the end product (recycled coarse aggregate). This also applies to the "manufacturing method 2" to be later described.

The raw material(s) milled by the first mill (119) is supplied to a classifier (vibrating sieve) (121) after metal is removed by a suspending electromagnet (120) for iron removal.

At the classifier (vibrating sieve) (121), the supplied raw material(s) is classified into small diameter components each having a second standard particle diameter (5 mm) or smaller and large diameter components each having the second standard particle diameter (5 mm) or greater (second classification step).

The above-described four kinds of raw materials are sequentially provided to the second classification step. Then, the small diameter components (111A) and (111B) each having a particle diameter of 0-10 mm is classified into the small diameter components (0-5 mm) each having the second standard particle diameter (5 mm) or smaller and the large diameter components (5-10 mm) each having the second standard particle diameter (5 mm) or greater. The large diameter components (112A) and (112B) each having a particle diameter of 10-25 mm is classified into the small diameter components (0-5 mm) and the large diameter components (5-20 mm). It is noted that the large diameter components (112A) and (112B) should not include the components each having a size of 5 mm or smaller; however since minute components such as cement powder are mixed therein, the large diameter components (112A) and (112B) include a slight amount of components each having a size of 5 mm or smaller. The components each having a size of 5 mm or smaller are classified as small diameter components (0-5 mm).

The small diameter components (0-5 mm) classified in the second classification step are supplied to and washed by a spiral washer (123), and then supplied to a second mill (124).

A mill which does not include a milling medium for milling a to-be-milled material(s) is used as the second mill (124). Specifically, a mill having a similar structure to the first mill (119) can be used.

At the second mill (124), a milling step (second milling step) for rubbing small diameter components (0-5 mm) with each other is performed, and then the small diameter components (0-5 mm) are supplied to and washed by the spiral washer (123). Thereby, the cement powder generated due to the rubbing of small diameter components with each other is removed.

The small diameter components (0-5 mm) from which the cement powder has been removed are accommodated in a hopper (126).

It is noted that in the present invention, the second milling step may be omitted without providing the second mill (124). In this case, after the small diameter components (0-5 mm) classified in the second classification step are supplied to and washed by a spiral washer (125), they are accommodated in the hopper (126) without being supplied to the second mill (124).

The large diameter components (5-20 mm) classified by the classifier (vibrating sieve) (121) are accommodated in a hopper (128) after foreign matters (impurities, fine powder, etc.) are removed by a foreign matter collecting machine (127).

When the above-described post-processing step 1 is sequentially performed on the above-described four kinds of raw materials, large diameter components (112C) each having a size of 5-20 mm of the sandstone based raw material, large diameter components (112D) each having a size of 5-20 mm of the lime based raw material, small diameter components (111C) each having a size of 0-5 mm of the sandstone based raw material, small diameter components (111D) each having a size of 0-5 mm of the lime based raw material, large diameter components (112E) each having a size of 5-10 mm of the sandstone based raw material, and large diameter components (112F) each having a size of 5-10 mm of the lime based raw material are obtained.

Herein, the small diameter components (111C) each having a size of 0-5 mm of the sandstone based raw material include the ones (111C-1) obtained from the small diameter components (111A) each having a particle diameter of 0-10 mm and the ones (111C-2) obtained from the large diameter components (112A) each having a particle diameter of 10-25 mm.

The small diameter components (111D) each having a size of 0-5 mm of the lime based raw material include the ones (111D-1) obtained from the small diameter components (111B) each having a particle diameter of 0-10 mm and the ones (111D-2) obtained from the large diameter components (112B) each having a particle diameter of 10-25 mm.

<Post-Processing Step 2>

The four kinds of large diameter components (112C), (112D), (112E), and (112F) obtained in the post-processing step 1 (hereinafter, referred to as "group of large diameter components") and the two kinds of small diameter components (111C) and (111D) (hereinafter, referred to as "group of small diameter components") are sequentially provided to the following steps in a separate manner. For example, the large diameter components (112C), (112D), (112E), and (112F) are provided first and then the small diameter components (111C) and (111D) are provided. However, the order of the providing is not limited to this.

The case where the group of large diameter components is provided first will be described as an example.

The large diameter components (112C) each having a size of 5-20 mm of the sandstone based raw material, the large diameter components (112D) each having a size of 5-20 mm of the lime based raw material, the large diameter components (112E) each having a size of 5-10 mm of the sandstone based raw material, and the large diameter components (112F) each having a size of 5-10 mm of the lime based raw material are supplied to the first mill (119) through the first entrance port (117) and the second entrance port (118), respectively.

As for the volume ratio between the sandstone based raw material (first raw material) and the lime based raw material (second raw material) to be supplied to the first mill (119), the ratio (volume ratio) of the second raw material to the entire raw material is preferably set at 30% or greater, and more preferably set at 50% or greater.

The reason thereof is because when only the lime based raw material (second raw material) is used or when the ratio of the lime based raw material is 30% or greater, there is no concern that recycled aggregate to be manufactured shows any alkali silica reaction; however when the lime based raw material (second raw material) is mixed with the sandstone based raw material (first raw material) and the ratio of the lime based raw material (second raw material) becomes less than 30%, the pessimum phenomenon is likely to occur. Thus, there is concern that the recycled aggregate to be manufactured may show alkali silica reaction, which is not preferable.

After the first raw material and the second raw material (large diameter components (112C), (112D), (112E), and (112F)) supplied to the first mill (119) are rubbed with each other, they are supplied to the suspending electromagnet (120) for iron removal and the classifier (vibrating sieve) (121), as in the case of post-processing step 1 described above.

At the classifier (vibrating sieve) (121), the supplied raw material (large diameter components (112C), (112D), (112E), and (112F)) is classified into the small diameter components (0-5 mm) each having the second standard particle diameter (5 mm) or smaller and the large diameter components (5-20 mm) each having the second standard particle diameter (5 mm) or greater. It is noted that the large diameter components (112C), (112D), (112E), and (112F) should not include the components each having a size of 5 mm or smaller; however since minute components such as cement powder are mixed therein, the large diameter components (112C), (112D), (112E), and (112F) include a slight amount of components each having a size of 5 mm or smaller. The components each having a size of 5 mm or smaller are classified as small diameter components (0-5 mm).

The small diameter components (0-5 mm) classified in the second classification step are supplied to and washed by the spiral washer (123), and then supplied to the second mill (124).

At the second mill (124), the milling step (second milling step) for rubbing small diameter components (0-5 mm) with each other is performed, and then the small diameter components (0-5 mm) are supplied to and washed by the spiral washer (123). Thereby, the cement powder generated due to the rubbing of small diameter components with each other is removed. The small diameter components (0-5 mm) from which the cement powder has been removed are accommodated in the hopper (126).

It is noted that the second milling step may be omitted without providing the second mill (124). In this case, after the small diameter components (0-5 mm) classified in the second classification step are supplied to and washed by the spiral washer (123), they are accommodated in the hopper (126) without being supplied to the second mill (124).

The large diameter components (5-20 mm) classified by the classifier (vibrating sieve) (121) are accommodated in the hopper (128) after foreign matters (impurities, fine powder, etc.) are removed by the foreign matter collecting machine (127).

The small diameter components (0-5 mm) accommodated in the hopper (126) and the large diameter components (5-20 mm) accommodated in the hopper (128) are temporarily moved to another place and stored therein.

Accordingly, the processing of the group of large diameter components is completed.

As a result of the above process, components each having a size of 5-20 mm (hereinafter, referred to as "mixed large diameter components α"), in which the large diameter components each having a size of 5-20 mm of the sandstone based raw material and the large diameter components each having a size of 5-20 mm of the lime based raw material are mixed at a predetermined ratio (ratio of the lime based raw material is 30% or greater); and components each having a size of 0-5 mm (hereinafter, referred to as "mixed small diameter components α"), in which the small diameter components each having a size of 0-5 mm of the sandstone based raw material and the small diameter components each having a size of 0-5 mm of the lime based raw material are mixed at a predetermined ratio (ratio of the lime based raw material is 30% or greater), are obtained.

However, since both of the mixed large diameter components α and the mixed small diameter components α are obtained from the large diameter components (112C), (112D), (112E), and (112F), most of the mixed large diameter components α and the mixed small diameter components α are the mixed large diameter components α. The amount of the mixed small diameter components α is small.

Next, processing of the group of small diameter components is performed.

The small diameter components (111C) each having a size of 0-5 mm of the sandstone based raw material and the small diameter components (111D) each having a size of 0-5 mm of the lime based raw material are supplied to the first mill (119) through the first entrance port (117) and the second entrance port (118), respectively. Then, similar processing to that of the group of large diameter components is performed on the group of the small diameter components.

Herein, as in the case of the group of large diameter components, as for the ratio (volume ratio) between the sandstone based raw material (first raw material) and the lime based raw material (second raw material) to be supplied to the first mill (119), the ratio (volume ratio) of the second raw material to the entire raw material is preferably set at 30% or greater, and more preferably set at 50% or greater.

The reason thereof is because when only the lime based raw material (second raw material) is used or when the ratio of the lime based raw material is 30% or greater, there is no concern that recycled aggregate to be manufactured shows any alkali silica reaction; however when the lime based raw material (second raw material) is mixed with the sandstone based raw material (first raw material) and the ratio of the lime based raw material (second raw material) becomes less than 30%, the pessimum phenomenon is likely to occur. Thus, there is concern that the recycled aggregate to be manufactured may show alkali silica reaction, which is not preferable.

After the first raw material and the second raw material (small diameter components (111C) and (111D)) supplied to the first mill (119) are rubbed with each other, they are supplied to the suspending electromagnet (120) for iron removal and the classifier (vibrating sieve) (121), as in the case of post-processing step 1 described above.

At the classifier (vibrating sieve) (121), the supplied raw material (small diameter components (111C) and (111D)) is classified into the small diameter components (0-5 mm) each having the second standard particle diameter (5 mm) or smaller and the large diameter components (5-10 mm) each having the second standard particle diameter (5 mm) or greater. It is noted that the small diameter components (111C) and (111D) should not include components each having a size of 5 mm or greater; however it may include a slight amount of components each having a size of 5 mm or greater. In such a case, the components each having a size of 5 mm or greater are classified as large diameter components (5-10 mm).

The small diameter components (0-5 mm) classified in the second classification step are supplied to and washed by the spiral washer (123), and then supplied to the second mill (124).

At the second mill (124), the milling step (second milling step) for rubbing small diameter components (0-5 mm) with each other is performed, and then the small diameter components (0-5 mm) are supplied to and washed by the spiral washer (125). Thereby, the cement powder generated due to the rubbing of small diameter components with each other is removed. The small diameter components (0-5 mm) from which the cement powder has been removed are accommodated in the hopper (126).

It is noted that the second milling step may be omitted without providing the second mill (124). In this case, after the small diameter components (0-5 mm) classified in the second classification step are supplied to and washed by the spiral washer (123), they are accommodated in the hopper (126) without being supplied to the second mill (124).

The large diameter components (5-10 mm) classified by the classifier (vibrating sieve) (121) are accommodated in the hopper (128) after foreign matters (fine powder, etc.) are removed by the foreign matter collecting machine (127).

Accordingly, the processing of the group of small diameter components is completed.

As a result of the above process, components each having a size of 5-20 mm (hereinafter, referred to as "mixed large diameter components β"), in which the large diameter components each having a size of 5-20 mm of the sandstone based raw material and the large diameter components each having a size of 5-20 mm of the lime based raw material are mixed at a predetermined ratio (ratio of the lime based raw material is 30% or greater); and components each having a size of 0-5 mm (hereinafter, referred to as "mixed small diameter components β"), in which the small diameter components each having a size of 0-5 mm of the sandstone based raw material and the small diameter components each having a size of 0-5 mm of the lime based raw material are mixed at a predetermined ratio (ratio of the lime based raw material is 30% or greater), are obtained.

However, since both of the mixed large diameter components β and the mixed small diameter components β are obtained from the small diameter components (111C) and (111D), most of the mixed large diameter components β and the mixed small diameter components β are the mixed small diameter components β. The amount of the mixed large diameter components β is small.

<Post-Processing Step 3>

The mixed large diameter components (α, β) and the mixed small diameter components (α, β) obtained in the post-processing step 2 are supplied to the first mill (119) through the first entrance port (117) and the second entrance port (118), respectively. In other words, both of the mixed large diameter components and the mixed small diameter components are supplied to the first mill (119).

Herein, as for the ratio (volume ratio) between the mixed large diameter components and the mixed small diameter components to be supplied to the first mill (119), the ratio among the components to be provided to the post-processing step is set such that the volume of the large diameter components is equal to or greater than the volume of the small diameter components, as described above. Accordingly, the amount of the mixed large diameter components is relatively larger than that of the mixed small diameter components at a predetermined ratio or greater.

The mixed large diameter components function as rubbing off the cement paste adhering to the surface of the mixed small diameter components. Thus, when the amount of the large diameter components is larger than that of the small diameter components at a predetermined ratio or greater, this rubbing-off function is fully exhibited. As a result, the cement paste adhering to the surface of the aggregate to be manufactured is certainly removed.

It is noted that it is more preferable that the ratio is set such that the volume of the mixed large diameter components to be supplied to the first mill (119) is set equal to or greater than the volume of the mixed small diameter components to be supplied thereto. Thereby, the above-described function of rubbing off the cement paste is more certainly exhibited. The ratio (volume) of the large diameter components to the entire raw material is preferably set at 50% or greater, and more preferably set at between 50 and 70%.

The mixed large diameter components (α, β) and the mixed small diameter components (α, β) supplied to the first mill (119) are rubbed with each other to remove the cement paste therefrom, and then they are discharged in a mixed state (hereinafter, referred to as "mixture").

The mixture is supplied to the suspending electromagnet (120) for iron removal and the classifier (vibrating sieve) (121), as in the case of post-processing step 1 described above.

At the classifier (vibrating sieve) (121), the supplied mixture is classified into the small diameter components (0-5 mm) each having a standard particle diameter (5 mm) or smaller and the large diameter components (5-20 mm) each having the standard particle diameter (5 mm) or greater.

The small diameter components (0-5 mm) classified in the second classification step are supplied to and washed by the spiral washer (123), and then supplied to the second mill (124).

At the second mill (124), the milling step (second milling step) for rubbing small diameter components (0-5 mm) with each other is performed, and then the small diameter components (0-5 mm) are supplied to and washed by the spiral washer (125). Thereby, the cement powder generated due to the rubbing of small diameter components with each other is removed. The small diameter components (0-5 mm) from which the cement powder has been removed are accommodated in the hopper (126).

It is noted that the second milling step may be omitted without providing the second mill (124). In this case, after the small diameter components (0-5 mm) classified in the second classification step are supplied to and washed by the spiral washer (123), they are accommodated in the hopper (126) without being supplied to the second mill (124).

The large diameter components (5-20 mm) classified by the classifier (vibrating sieve) (121) are accommodated in the hopper (128) after foreign matters (fine powder, etc.) are removed by the foreign matter collecting machine (127).

The large diameter components (5-20 mm) accommodated in the hopper (128) and the small diameter components (0-5 mm) accommodated in the hopper (126) are once again supplied to the first mill (11) and then provided to the above-described first milling step, second classification step and second milling step (reprocessing step). It is noted that the second milling step may be omitted in the reprocessing step.

It is noted that as for the ratio (volume ratio) between the large diameter components and the small diameter components to be supplied to the first mill (119) in the reprocessing step, it is preferable that the ratio is set such that the volume of the large diameter components is equal to or greater than the volume of the small diameter components. Thereby, the above-described function of rubbing off the cement paste is more certainly exhibited.

The above-described reprocessing step is performed at least once, and preferably twice or more.

After the reprocessing step is performed at least once or more, the large diameter components (5-20 mm) classified in the second classification step in the last-performed reprocessing step (which indicates the second reprocessing step when the reprocessing step is performed twice, for example) are accommodated in a hopper (131) to be collected as recycled coarse aggregate, and the small diameter components (0-5 mm) milled in the second milling step in the last-performed reprocessing step are accommodated in a hopper (132) to be collected as recycled fine aggregate.

As for the recycled aggregate, the large diameter components (131) collected in the hopper (131) correspond to RHG2005A (recycled coarse aggregate H2005) stipulated in JIS A 5021, and the small diameter components collected in the hopper (132) correspond to RHS A (recycled fine aggregate H) stipulated in JIS A 5021.

[Manufacturing Method 2 (when Two Kinds of Raw Materials are Used)]

Next, the case where two kinds of raw materials are used will be described.

In this case, two kinds of sandstone based raw materials (large diameter components (112A) each having a size of 10-25 mm and small diameter components (111A) each having a size of 0-10 mm) are used, or two kinds of lime based raw materials (large diameter components (112B) each having a size of 10-25 mm and small diameter components (111B) each having a size of 0-10 mm) are used.

However, it is preferable to use two kinds of lime based raw materials in order to certainly obtain high quality recycled aggregate for concrete which is determined harmless in an alkali silica reactivity test.

Herein, as for the ratio among the components to be provided to the post-processing step, the ratio is set such that the volume of the large diameter components is equal to or greater than the volume of the small diameter components, as in the case of the above-described four kinds of raw materials. The ratio (volume) of the large diameter components to the entire raw material is preferably set at 50% or greater, and more preferably set at between 50 and 70%.

The above-described two kinds of raw materials are sequentially provided to the post-processing step in a separate manner, as in the case where the four kinds of raw materials are used. The above described post-processing step is the same as the case where four kinds of raw materials are used except that the post-processing step 2 is not required when the two kinds of raw materials are used. Accordingly, part of the description for the steps which are the same as when four kinds of raw materials are used will be omitted.

When the post-processing step 1 is sequentially performed on the two kinds of raw materials, the large diameter components (112C) each having a size of 5-20 mm of the sandstone based raw material, the large diameter components (112E) each having a size of 5-10 mm of the sandstone based raw material, and the small diameter components (111C) each having a size of 0-5 mm of the sandstone based raw material; or the large diameter components (112D) each having a size of 5-20 mm of the lime based raw material, the large diameter components (112F) each having a size of 5-10 mm of the lime based raw material, and the small diameter components (111D) each having a size of 0-5 mm of the lime based raw material are obtained.

When two kinds of raw materials are used, either the sandstone based raw material or the lime based raw material is only used. Thus, the post-processing step 2 for mixing the sandstone based raw material (first raw material) and the lime based raw material (second raw material) is not performed, unlike the case where four kinds of raw materials are used.

Accordingly, the large diameter components (112C) each having a size of 5-20 mm of the sandstone based raw material, the large diameter components (112E) each having a size of 5-10 mm of the sandstone based raw material, and the small diameter components (111C) each having a size of 0-5 mm of the sandstone based raw material obtained in the post-processing step 1; or the large diameter components (112D) each having a size of 5-20 mm of the lime based raw material, the large diameter components (112F) each having a size of 5-10 mm of the lime based raw material, and the small diameter components (111D) each having a size of 0-5 mm of the lime based raw material obtained in the post-processing step 1 are provided to the post-processing step 3.

The large diameter components (112C) each having a size of 5-20 mm of the sandstone based raw material, the large diameter components (112E) each having a size of 5-10 mm of the sandstone based raw material, and the small diameter components (111C) each having a size of 0-5 mm of the sandstone based raw material obtained in the post-processing step 1; or the large diameter components (112D) each having a size of 5-20 mm of the lime based raw material, the large diameter components (112F) each having a size of 5-10 mm of the lime based raw material, and the small diameter components (111D) each having a size of 0-5 mm of the lime based raw material obtained in the post-processing step 1 are supplied to the first mill (119) through the first entrance port (117) and the second entrance port (118), respectively. In other words, both of the large diameter components and the small diameter components are supplied to the first mill (119).

Herein, as for the ratio (volume ratio) between the large diameter components and the small diameter components to be supplied to the first mill (119), the ratio among the components to be provided to the post-processing step is set such that the volume of the large diameter components is equal to or greater than the volume of the small diameter components, as described above. Accordingly, the amount of the large diameter components is relatively larger than that of the small diameter components at a predetermined ratio or greater.

The large diameter components function as rubbing off the cement paste adhering to the surface of the small diameter components. Accordingly, when the amount of the large diameter components is larger than that of the small diameter components at a predetermined ratio or greater, this rubbing-off function is fully exhibited. As a result, the cement paste adhering to the surface of the aggregate to be manufactured is certainly removed.

It is noted that it is more preferable that the ratio is set such that the volume of the large diameter components to be supplied to the first mill (119) is set greater than the volume of the small diameter components to be supplied thereto. Thereby, the above-described function of rubbing off the cement paste is more certainly exhibited.

The large diameter components (112C) and (112E) and the small diameter components (111C) supplied to the first mill (119) or the large diameter components (112D) and (112F) and the small diameter components (111D) supplied to the first mill (119) are rubbed with each other to remove the cement pate therefrom, and then they are discharged in a mixed state (hereinafter, referred to as "mixture").

The mixture is supplied to the suspending electromagnet (120) for iron removal and the classifier (vibrating sieve) (121), as in the case of post-processing step 1 described above.

At the classifier (vibrating sieve) (121), the supplied mixture is classified into the small diameter components (0-5 mm) each having the standard particle diameter (5 mm) or smaller and the large diameter components (5-20 mm) each having the standard particle diameter (5 mm) or greater.

The small diameter components (0-5 mm) classified in the second classification step are supplied to and washed by the spiral washer (123), and then supplied to the second mill (124).

At the second mill (124), the milling step (second milling step) for rubbing small diameter components (0-5 mm) with each other is performed, and then the small diameter components (0-5 mm) are supplied to and washed by the spiral washer (123). Thereby, the cement powder generated due to the rubbing of small diameter components with each other is removed. The small diameter components (0-5 mm) from which the cement powder has been removed are accommodated in the hopper (126).

It is noted that the second milling step may be omitted without providing the second mill (124). In this case, after the small diameter components (0-5 mm) classified in the second classification step are supplied to and washed by the spiral washer (123), they are accommodated in the hopper (126) without being supplied to the second mill (124).

The large diameter components (5-20 mm) classified by the classifier (vibrating sieve) (121) are accommodated in the hopper (128) after foreign matters (impurities, fine powder, etc.) are removed by the foreign matter collecting machine (127).

The large diameter components (5-20 mm) accommodated in the hopper (128) and the small diameter components (0-5 mm) accommodated in the hopper (126) are once again supplied to the first mill (11) and then provided to the above-described first milling step, second classification step and second milling step (reprocessing step). It is noted that the second milling step may be omitted in the reprocessing step.

As for the ratio (volume ratio) between the large diameter components and the small diameter components to be supplied to the first mill (119) in the reprocessing step, it is preferable that the ratio is set such that the volume of the large diameter components is equal to or greater than the volume of the small diameter components. Thereby, the above-described function of rubbing off the cement paste is more certainly exhibited.

The above-described reprocessing step is performed at least once, and more preferably twice or more.

After the reprocessing step is performed at least once or more, the large diameter components (5-20 mm) classified in the second classification step in the last-performed reprocessing step (which indicates the second reprocessing step when the reprocessing step is performed twice, for example) are accommodated in a hopper (131) to be collected as recycled coarse aggregate, and the small diameter components (0-5 mm) milled in the second milling step in the last-performed reprocessing step are accommodated in the hopper (132) to be collected as recycled fine aggregate.

As for the recycled aggregate to be collected, the large diameter components collected in the hopper (131) correspond to RHG2005A (recycled coarse aggregate H2005) stipulated in JIS A 5021, and the small diameter components collected in the hopper (132) correspond to RHS A (recycled fine aggregate H) stipulated in JIS A 5021.

Recycled aggregate obtained by the manufacturing method (manufacturing method 1 or 2) according to the present invention described above has absolute dry density of 2.5 g/cm$^3$ or greater and water absorption of 3.0% or smaller. Accordingly, it corresponds to the quality classification H stipulated in JIS A 5021 as will be shown in EXAMPLES later.

In the above-described manufacturing methods 1 and 2 according to the present invention, a mixing step which uses a mixer (133) shown in FIG. 2 may also be performed.

The mixer (133) mixes: the small diameter components (111C-1) and (111D-1) which are obtained from the components each having a size of 0-10 mm supplied from the pre-processing step; and the small diameter components (111C-2) and (111D-2) which are obtained from the components each having a size of 10-25 mm supplied from the pre-processing step. In addition, the mixer (133) mixes: the large diameter components (112C) and (112D) which are obtained from the components each having a size of 10-25 mm supplied from the pre-processing step; and the large diameter components (112E) and (112F) which are obtained from the components each having a size of 0-10 mm supplied from the pre-processing step. The mixed large diameter components are supplied to the hopper (131), and the mixed small diameter components are supplied to the hopper (132).

By performing the mixing step, particle diameter range and fineness modulus defined for recycled aggregate can be accurately managed.

Hereinafter, preferable embodiments of the mill (the first mill (119) and the second mill (124)) used in the manufacturing method (the manufacturing method 1 or 2) according to the present invention will be described with reference to the drawings. However, the mill used in the manufacturing method according to the present invention is not limited to the one which has the structure to be described later, and a publicly known ball mill or rod mill from which a milling medium (ball, rod, etc.) is removed may also be used.

Figure 3:
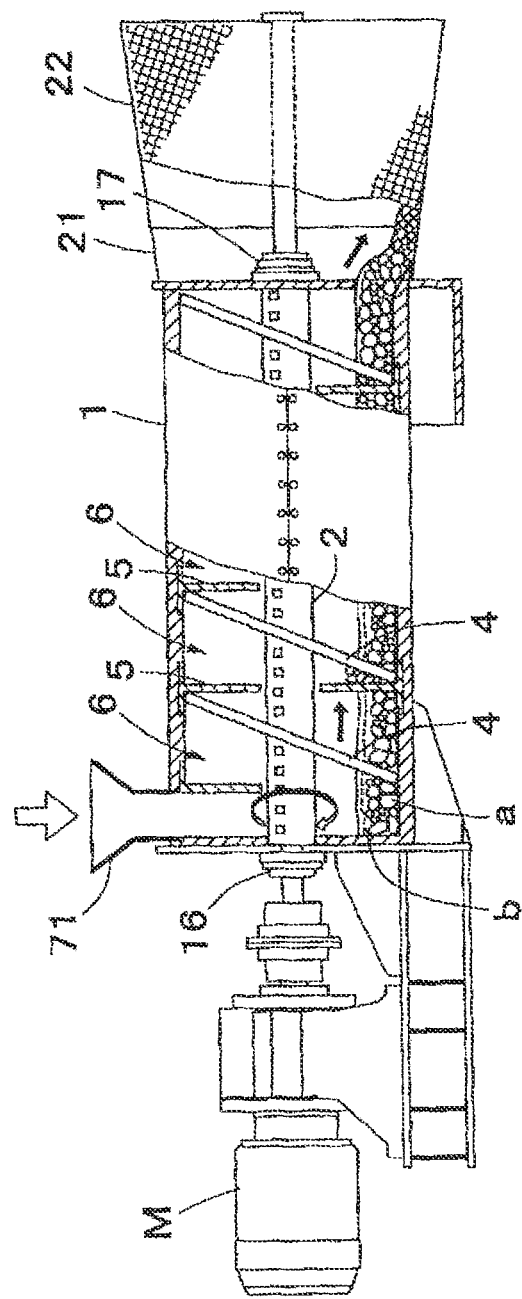
FIG. 3 is a partial cross sectional front view of a mill according to a first embodiment of the present invention.

FIG. 3 is a partial cross sectional front view of the mill according to a first embodiment of the present invention.

The mill according to the first embodiment includes: a cylindrical drum body (1) configured such that a to-be-milled material(s) (raw material(s)) can be taken in through a part (hopper (71)) thereof and be discharged from the other part (discharge hopper (21)) thereof; a central shaft (2) penetrating the drum body (1) in the cylinder lengthwise direction thereof; a plurality of milling plates (4) which are attached at predetermined spacing in the longitudinal direction of the central shaft (2) and partition the internal space of the drum body (1) into a plurality of milling chambers (6); and a plurality of pressure-receiving members (5) which are attached to the drum body (1) and face the corresponding milling plates (4).

In addition, on the downstream side of the discharge hopper (21), there is attached a sieve member (22) which rotates together with the central shaft (2).

Both ends of the central shaft (2) are supported by a pair of bearing members (16) and (17).

To one end (on the upstream side) of the central shaft (2), there is coupled a motor (M) used as a drive source for rotating the central shaft (2), and to the other end (on the downstream side), there is attached the sieve member (22). The sieve member (22) has a cylindrical shape with a taper of which diameter becomes gradually larger as it moves away from the drum body (1).

An upper semicylindrical member and a lower semicylindrical member of the drum body (1) are combined so that the drum body (1) has a substantially cylindrical shape.

The plurality of milling plates (4) each is provided in the axial direction of the central shaft (2) at certain spacing, and partitions the internal space of the drum body (1) into the plurality of milling chambers (6) in the axial direction. The milling plates (4) are inclined with respect to a plane orthogonal to the central shaft (2) and substantially parallel to each other.

The milling chambers (6) each do not include a milling medium (ball, rod, etc.) for milling a to-be-milled material(s) by coming into contact with the to-be-milled material(s) while rolling in the drum body.

The plurality of pressure-receiving members (5) each is arranged in a milling chamber (6), and it is orthogonal to the central shaft (2).

In the mill of the present embodiment, a to-be-milled material(s) (a) together with water (b) is supplied from the hopper (71) and passes through the milling chambers (6) sequentially. Then, it is discharged from the discharge hopper (21) located on the most downstream side of the drum body (1) and then delivered to the sieve member (22).

However, instead of employing such a wet-type structure, a dry-type structure may be employed in which a to-be-milled material(s) (a) is delivered by blower or by operation generated by rotation of the milling plates or the like without blower. It is noted that either the wet-type structure or the dry-type structure can be employed in a later-described second embodiment.

FIGS. 5(a), 5(b), and 5(c) are drawings each showing a milling plate according to the present embodiment, and FIG. 5(a) is a plan view thereof, FIG. 5(b) is a side view thereof, and FIG. 5(c) is a sectional view thereof taken along line IIIc-IIIc.

Two semicircle-like curved plates are combined so that the milling plate (4) has a substantially circular structure. The central shaft (2) is inserted into a central hole (41) of the milling plate (4). The milling plate (4) is attached so as to be inclined clockwise with respect to a plane orthogonal to the central shaft (2).

It is noted that even if the inclined direction of the milling plate (4) is opposite to that in the present embodiment, no adverse effect for the milling processing occurs since a to-be-milled material(s) (a) is moved by water flow (in case of the wet-style structure) or air flow (in case of the dry-style structure).

On the milling plate (4), there is arranged a plurality of partially-arc through holes (42) in a concentric circle. The arc width of a through hole (42) is set such that only a to-be-milled material(s) (a) which has been milled to have less than a predetermined particle diameter can pass therethrough. The size (arc width) of the through hole (42) may be gradually decreased from the milling plate (4) on the upstream side of the drum body (1) toward the milling plate (4) on the downstream side thereof. For example, in the case where a milled material(s) each having a size of 0-25 mm is obtained as resultant components, the size of the through hole (42) can sequentially be decreased to 50 mm, 40 mm, 35 mm, 30 mm, and 25 mm from the upstream side toward the downstream side. This can be applied to milling plates of the later-described second embodiment.

Furthermore, as shown in FIGS. 5(b) and (c), hemispherical convex portions (43) are provided on the surface of the milling plate (4), and a large concave-convex pattern is formed thereon. This large concave-convex pattern could have some good effect. For example, when a to-be-milled material(s) (a) diagonally hits the milling plate (4), it slightly slides on the surface of the milling plate (4) and then is rubbed by the convex portion (43), thereby improving the efficiency of milling the to-be-milled material(s) (a).

In addition, the convex portion (43) of the milling plate (4) can be made of an especially hard material (for example, cemented carbide), so that wearing of the milling plate (4) can be reduced, and the usable life of the milling plate (4) can be extended.

It is noted that a concave-convex pattern having relatively large concave portions may be formed instead of the convex portions (43). In this case, the same effect as in the concave-convex pattern having the convex portions (43) can be achieved.

Figure 5:
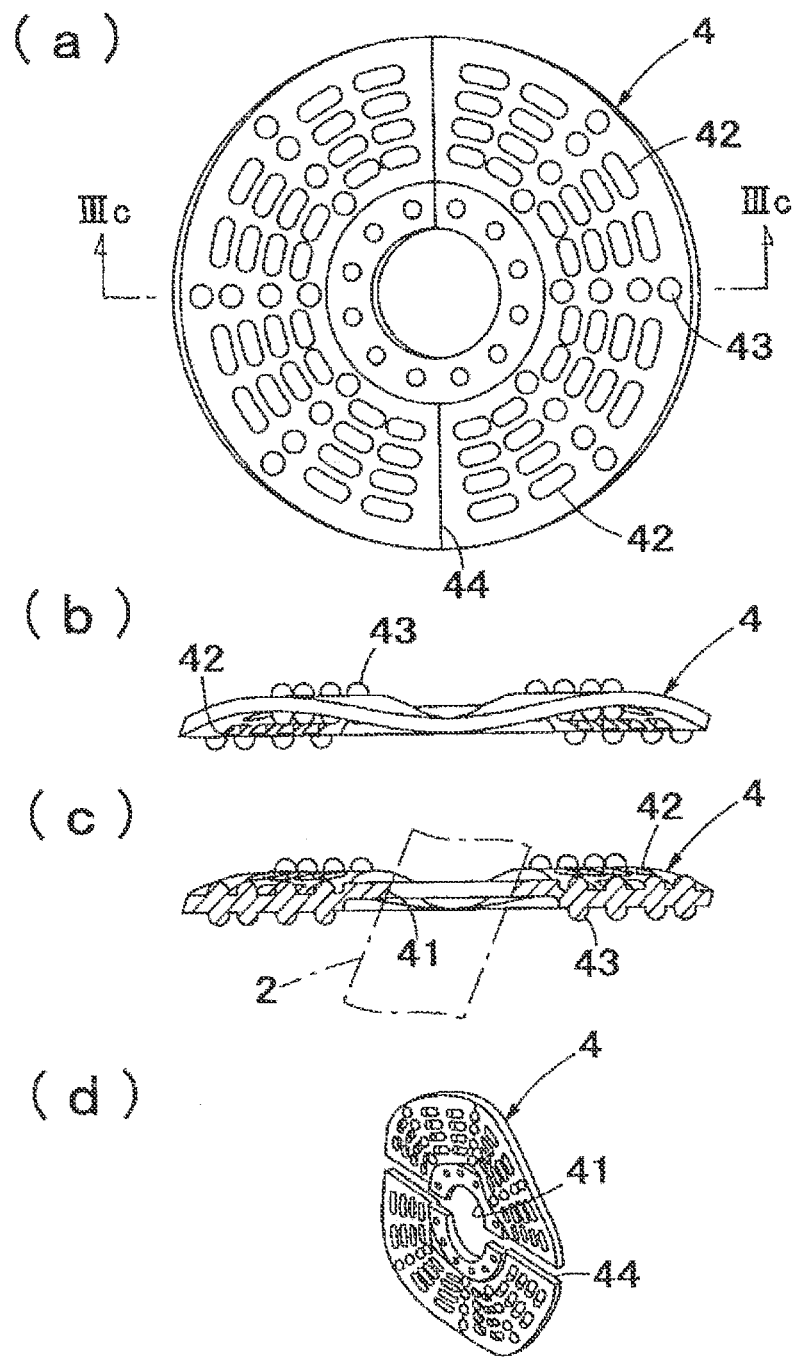
FIGS. 5(a), 5(b), 5(c), and 5(d) are drawings each showing a milling plate according to the first embodiment.

It is noted that FIG. 3 shows a tabular milling plate (4) for easy recognition, but the milling plate (4) in the present embodiment has a wavy curved-surface structure in which peaks and valleys are iteratively provided at certain spacing in its circumferential direction as shown in FIG. 5. The wavy curved-surface structure means that a peak part on the obverse side is a valley part on the reverse side. However, the milling plate (4) may have a planar structure. The shape of the milling plate (4) may be elliptical instead of circular. The same curved-surface structure may be employed for the later-described pressure-receiving member (5).

Figure 4:
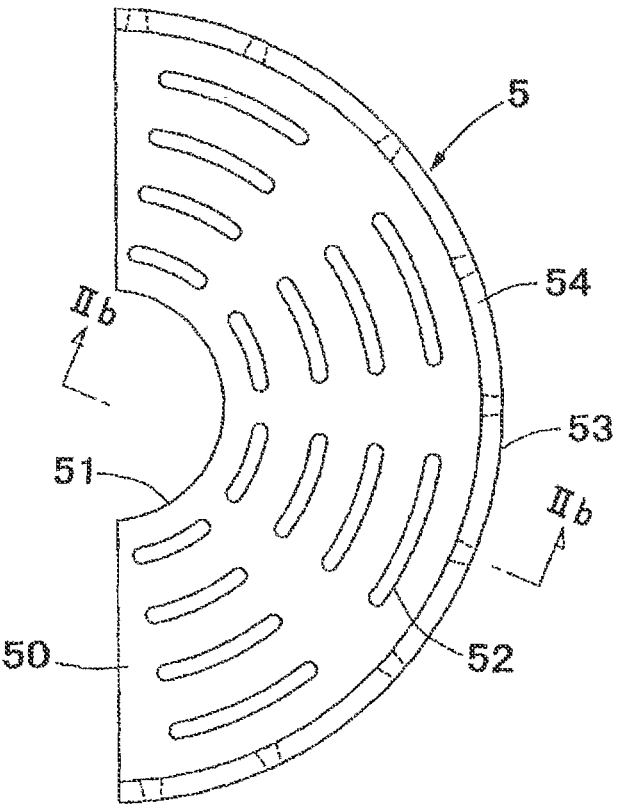
FIGS. 4(a) and 4(b) are drawings each showing a pressure-receiving member according to the first embodiment.
Figure 4:
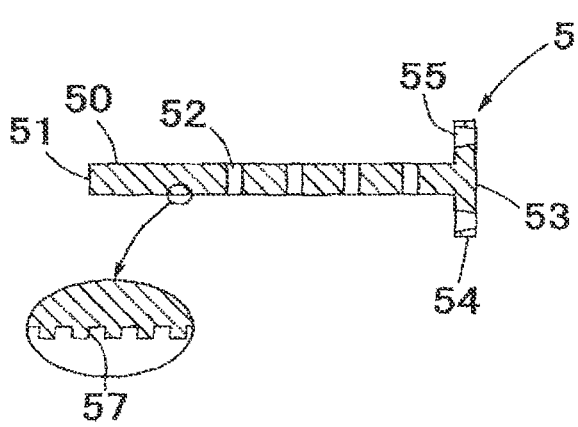

FIGS. 4(a) and 4(b) are drawings each showing the pressure-receiving member according to the present embodiment, and FIG. 4(a) is a plan view thereof, and FIG. 4(b) is a cross sectional view thereof taken along line IIb-IIb.

The pressure-receiving member (5) is divided into two parts so as to correspond to the drum body (1) made up of two semicylindrical parts, and it includes a semidisc portion (50) in a substantially semidisc shape and a flange portion (54) surrounding the outer periphery of the semidisc portion (50).

In the semidisc portion (50), a semicircular inner peripheral edge portion (51) is formed at a position corresponding to the central part of the two pressure-receiving members (5) combined. The semicircular inner peripheral edge portion (51) faces the central shaft (2) at predetermined spacing therebetween.

The pressure-receiving member (5) is attached to the drum body (1) by screws (not shown) while an outer periphery (53) of the semicylindrical flange portion (54) is in contact with the inner wall of the drum body (1). On the flange portion (54), there are provided insertion holes (55) for screws.

Although not shown in the cross sectional view of the pressure-receiving member (5) in FIG. 3 for easy recognition, a multiplicity of partially-arc through holes (52) is formed in a concentric circle on the semidisc portion (50) of the pressure-receiving member (5). The arc width of a through hole (52) is set such that only a to-be-milled material(s) (a) which has been milled to have less than a predetermined particle diameter in the milling chamber (6) can pass therethrough. The arc width of the through hole (52) may be gradually decreased from the pressure-receiving member (5) on the upstream side of the drum body (1) toward the pressure-receiving member (5) on the downstream side thereof.

In addition, the semidisc portion (50) and the flange portion (54) of the pressure-receiving member (5) have fine concave-convex patterns (57) formed by casting, press molding or the like as shown in the partial enlarged view of the FIG. 4(b).

It is noted that the pressure-receiving member (5) in the present embodiment has a tabular structure, but the pressure-receiving member (5) may have any curved-surface structure as will be later described. For example, the pressure-receiving member (5) may have any protruded structure shape in its front view, such as a piled-cone structure shape in its front view and an abacus's bead shape in its front view. In addition, the pressure-receiving member (5) may not be a circular plate but an elliptic plate in its side view. It is noted that "its front view" and "its side view" mean "the front view of the mill" and "the side view of the mill", respectively.

At least any one of the milling plate (4) and the pressure-receiving member (5) may rotate. However, in the present embodiment, the drum body (1) is fixed and the central shaft (2) rotates. Accordingly, in the present embodiment, the central shaft (2) rotates so as to rotate the milling plate (4) attached to the central shaft (2) while the pressure-receiving member (5) attached to the drum body (1) remains stationary.

Figure 8:
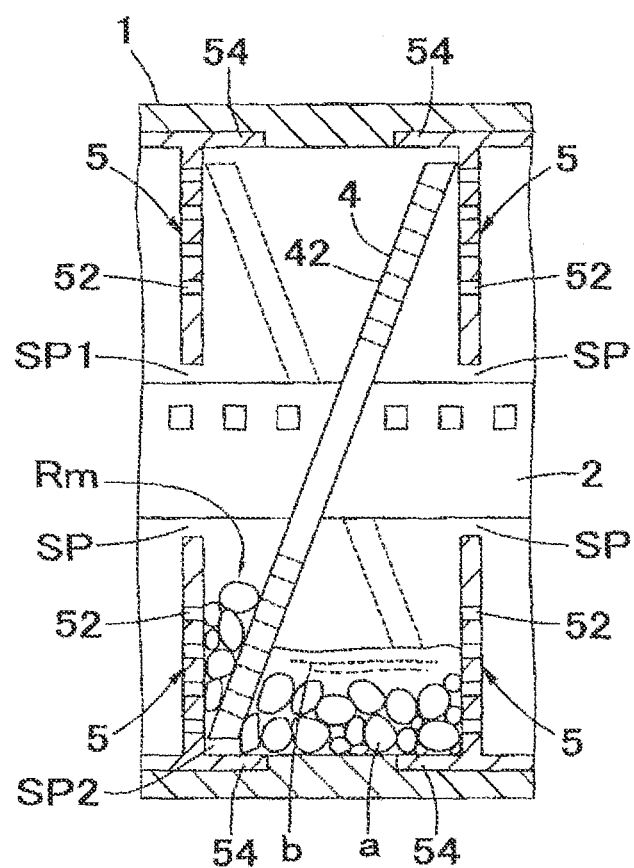
FIG. 8 is a cross sectional view for describing a milling operation by the pressure-receiving member and the milling plate.

FIG. 8 is a cross sectional view for describing a milling operation by the pressure-receiving member and the milling plate.

When the milling plate (4) rotates by 180 degrees from a position indicated by a solid line shown in FIG. 8, it moves to a position indicated by a broken line shown in FIG. 8. Then, the milling plate (4) keeps rotating such that it moves back to the position indicated by the solid line. During the rotation, in a narrow space (Rm) created by a close distance between the milling plate (4) and the pressure-receiving member (5), a to-be-milled material(s) (a) is strongly pressed between the milling plate (4) and the pressure-receiving member (5) and subjected to friction force generated by rotation of the milling plate (4). As a result, the to-be-milled material(s) (a) is rubbed by the pressure-receiving member (5) and the milling plate (4), or to-be-milled materials are rubbed with each other. Thereby, foreign matters such as cement adhering to the surface of the to-be-milled material(s) (a) are efficiently removed.

The to-be-milled material(s) (a) passes through the respective through holes (42) (52) of the milling plate (4) and the pressure-receiving member (5), through a space (Sp1) between the pressure-receiving member (5) and the central shaft (2), and through a space (Sp2) between the milling plate (4) and the drum body (1), and then the to-be-milled material(s) (a) is delivered to the downstream side together with water (b).

At that time, edges of the multiplicity of through holes (42) (52) provided on the milling plate (4) and the pressure-receiving member (5) can also scrape off foreign matters. Thereby, the foreign matters are more effectively removed.

The structure of the mill is not limited to the one shown in FIG. 3.

For example, only the pressure-receiving member (5) may be rotated and the milling plate (4) may be fixed.

In this case, only the drum body (1) rotates. However, even if a to-be-milled material(s) (a) strongly hits the drum body (1), the milling plate (4), and the pressure-receiving member (5) because of the centrifugal force generated by rotation of the drum body (1), loud noise such as the one generated by the collision between the drum body (1) and a milling medium does not occur. In addition, the rotation of the drum body (1) can give large centrifugal force to the to-be-milled material(s) (a). Thus, the collision of the to-be-milled materials (a) with the flange portion (54) of the pressure-receiving member (5) improves the milling efficiency.

In addition, the milling plate (4) and the pressure-receiving member (5) may rotate in opposite directions with respect to each other.

In this case, frictional force acting on a to-be-milled material(s) (a) held between the milling plate (4) and the pressure-receiving member (5) can be increased. Thereby, the milling efficiency can be improved.

Figure 7:
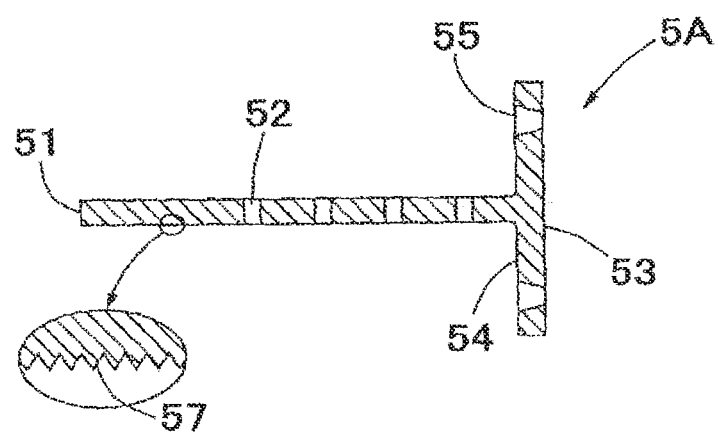
FIG. 7 is a cross sectional view showing a first alternative embodiment of the pressure-receiving member.

FIG. 7 is a cross sectional view showing a first alternative embodiment of the pressure-receiving member (5).

The width of the flange portion (54) of the pressure-receiving member (5) according to the first alternative embodiment is larger than the one shown in FIG. 4(b). For example, the flange portion (54) extends to the midway point of corresponding milling chambers (6). When the width of the flange portion (54) is set larger in this manner, the area of the inner surface side of the flange portion (54) colliding with a to-be-milled material(s) (a) becomes larger. Thereby, the milling efficiency can be improved.

In addition, as shown in the partial enlarged view of FIG. 7, a fine concave-convex pattern (57) formed by sandblast, etc. may be formed on a surface of the semidisc portion (50) or a surface of the flange portion (54) of the pressure-receiving member (5).

When a to-be-milled material(s) (a) diagonally hits the surface of the pressure-receiving member (5), it does not slide on the surface of the pressure-receiving member (5). Therefore, it is more likely that the to-be-milled material(s) is rubbed with large force because of the existence of the fine concave-convex pattern (57) shown in FIG. 4(b) or FIG. 7. Thus, providing the fine concave-convex pattern (57) on the pressure-receiving member (5) allows the efficiency of milling a to-be-milled material(s) (a) to further improve.

Although not shown in FIG. 5, the fine concave-convex pattern may also be provided on the milling plate (4), thereby further improving the efficiency of milling a to-be-milled material(s) (a).

However, the fine concave-convex pattern is not necessarily provided on the milling plate (4) or the pressure-receiving member (5).

In addition, although not shown in FIG. 4(b) or FIG. 7, the large concave-convex pattern having a convex portion and a concave portion provided on the milling plate (4) may also be formed on the pressure-receiving member (5) (see later-described alternative embodiments). Also in this case, the above-described operation effect can be achieved.

General-purpose steel materials, high hardness steel materials (alloy steels, etc.), cemented carbide alloys, ceramics, metal-ceramics composite materials or the like is used for constituting the milling plate (4) and the pressure-receiving member (5). However, the materials for constituting the milling plate (4) and the pressure-receiving member (5) are not limited to the above-described materials. It is preferable to employ a material(s) with higher hardness in order to improve the milling efficiency or extend the usable life. A high hardness material may be used for constituting only a part such as the surfaces of the milling plate (4) and the pressure-receiving member (5) made of a general-purpose steel material by coating the high hardness material on the surfaces. This can also be applied to the later-described second embodiment.

Figure 6:
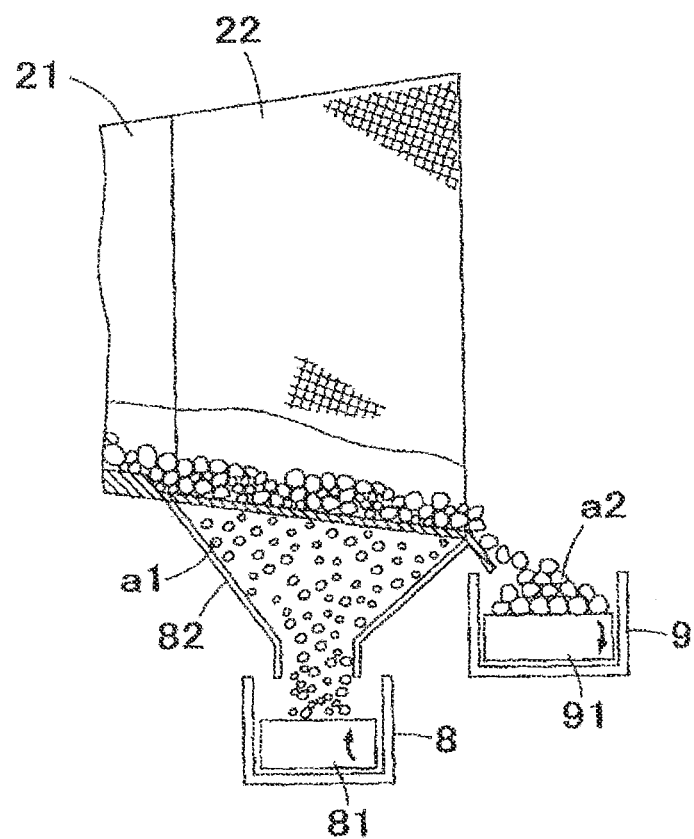
FIG. 6 is a partial cross sectional front view of a sieve member and a conveyor device according to the first embodiment.

FIG. 6 is a partial cross sectional front view of a sieve member and a conveyor device according to the present embodiment.

A guiding member (82) for receiving a to-be-milled material(s) (a1) each having a relatively small diameter which has passed through a mesh of the sieve member (22); and a first delivery device (8) arranged below the guiding member (82) are arranged below the sieve member (22). To the first delivery device (8), there is attached a first conveyor device (81) for delivering forward a to-be-milled material(s) (a1) with respect to the reverse side of the sheet of FIG. 6.

On the downstream side of the sieve member (22), there is arranged a second delivery device (9) for receiving a to-be-milled material(s) (a2) each having a relatively large diameter which has not passed through the mesh of the sieve member (22) and thus has been delivered thereto. To the second delivery device (9), there is attached a second conveyor device (91) for delivering forward a to-be-milled material(s) (a2) with respect to the obverse side of the sheet of FIG. 6.

According to the present embodiment, the sieve member (22) is provided at the end part of the mill on its downstream side to sort out the milled material(s) (to-be-milled material(s) already milled) based on the size and intended use thereof. Thus, the sorting step can be continuously performed subsequent to the milling step. Thereby, the overall efficiency can be improved.

The mesh size of the sieve member (22) can be arbitrarily selected depending on the kind of aggregate to be obtained as resultant product. For example, a mesh with a size of about 5 mm can be used to sort out a to-be-milled material(s) into gravel and sand.

A punching metal (steel plate) is generally used for the sieve member (22), but not particularly limited to this.

In addition, according to the present embodiment, the conveyor devices (81) and (91) for respectively conveying to-be-milled materials (a1) and (a2) are arranged. Thus, large sized containers for accommodating the sorted out to-be-milled materials (a1) and (a2) according to the intended use thereof can be arranged without interfering with the mill.

It is noted that the number of sieve members may be two or more, and three or more conveyor devices (delivery devices) may be arranged according to the number of sieve members.

Next, a further alternative embodiment of the pressure-receiving member (5) will be described.

FIGS. 9(a) and 9(b) are drawings each showing a second alternative embodiment of the pressure-receiving member, FIG. 9(a) is a perspective view of one pressure-receiving member, and FIG. 9(b) is a perspective view of two pressure-receiving members combined.

The pressure-receiving member (5) according to the second alternative embodiment includes the semidisc portion (50), of which shape is similar to that of the milling plate (4) shown in FIG. 5. In other words, the semidisc portion (50) is formed of a curved surface inclined with respect to a plane orthogonal to the central shaft (2). On the semidisc portion (50), there are provided: a multiplicity of convex portions (56) (concave-convex pattern) arranged in a concentric circle; and a multiplicity of partially arc-shaped through holes (52) arranged in a concentric circle. The inner peripheral edge portion (51) of the pressure-receiving member (5) faces the central shaft (2) at certain spacing therebetween.

The arc width of a through hole (52) is set such that only a to-be-milled material(s) (a) which has been milled to have less than a predetermined particle diameter can pass therethrough.

The width of the flange portion (54) is set large enough as in the case of the first alternative embodiment so that the pressure-receiving member (5) is attached to the drum body (1) while the outer peripheral portion (53) of the flange portion (54) is in contact with the drum body (1).

When the pressure-receiving member (5) is used with the semidisc portion (50) thereof inclined with respect to a plane orthogonal to the central shaft (2), it is preferable that the milling plate (4) is orthogonal to the central shaft (2). The milling plate (4) may have either a planar structure or a curved-surface structure. For example, the milling plate (4), which has substantially the same shape as that of the semidisc portion (50) of the pressure-receiving member (5) shown in FIG. 4, can be used.

Figure 10:
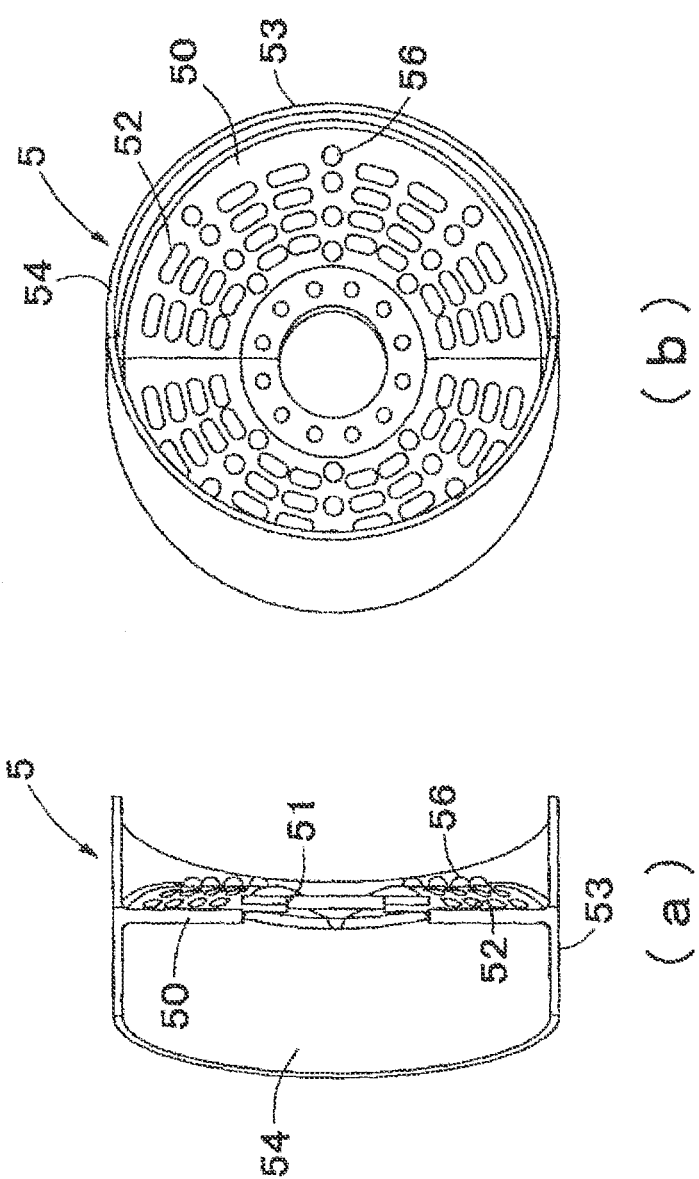
FIGS. 10(a) and 10(b) are drawings each showing a third alternative of the pressure-receiving member, and FIG.

FIGS. 10(a) and 10(b) are drawings each showing a third alternative embodiment of the pressure-receiving member, and FIG. 10(a) is a perspective view of one pressure-receiving member, and FIG. 10(b) is a perspective view of two pressure-receiving members combined.

The pressure-receiving member (5) according to the third alternative embodiment includes the semidisc portion (50) orthogonal to the central shaft (2). On the semidisc portion (50), there are provided a multiplicity of convex portions (56) (concave-convex pattern) arranged in a concentric circle; and a multiplicity of partially arc-shaped through holes (52) arranged in a concentric circle. The inner peripheral edge portion (51) of the pressure-receiving member (5) faces the central shaft (2) at predetermined spacing therebetween.

The arc width of a through hole (52) is set such that only a to-be-milled material(s) (a) which has been milled to have less than a predetermined particle diameter can pass therethrough.

The width of the flange portion (54) is set large enough as in the case of the first alternative embodiment so that the pressure-receiving member (5) is attached to the drum body (1) while the outer peripheral portion (53) of the flange portion (54) is in contact with the drum body (1).

When the pressure-receiving member (5) is used with the semidisc portion (50) thereof inclined with respect to the central shaft (2), it is preferable that the milling plate (4) is inclined with respect to the central shaft (2). The milling plate (4) may have either a planar structure or a curved-surface structure.

Figure 11:
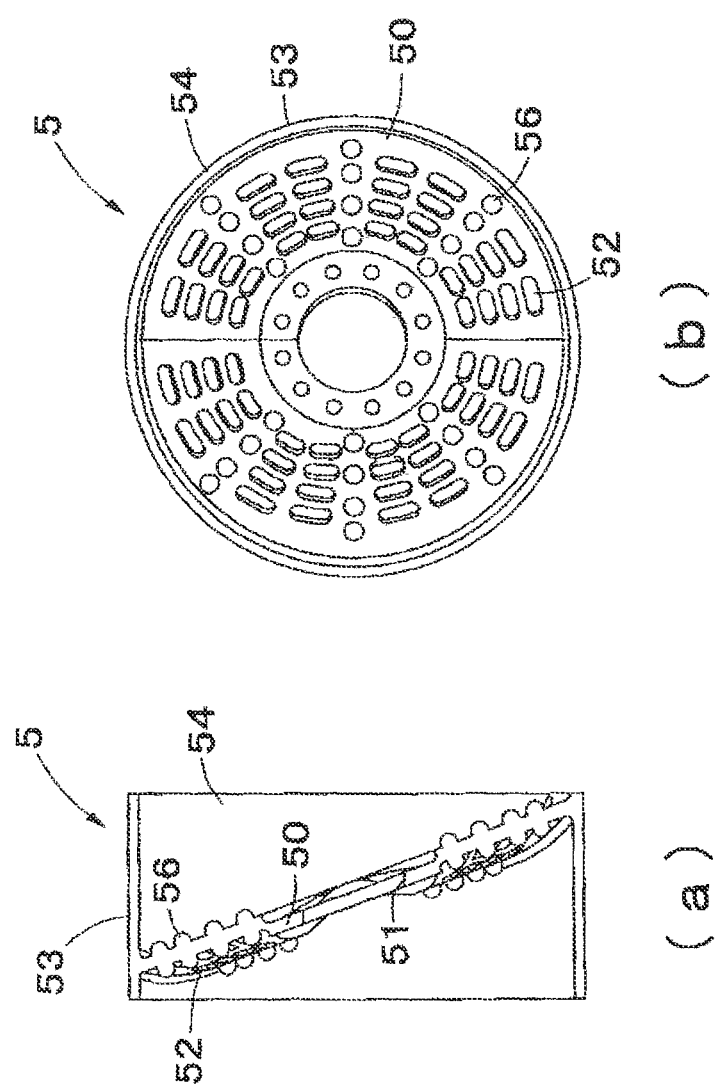
FIGS. 11(a) and 11(b) are drawings each showing a fourth alternative embodiment of the pressure-receiving section.

FIGS. 11(a) and 11(b) are drawings each showing a fourth alternative embodiment of the pressure-receiving section, and FIG. 11(a) is a perspective view of one pressure-receiving member, and FIG. 11(b) is a perspective view of two pressure-receiving members combined.

Figure 9:
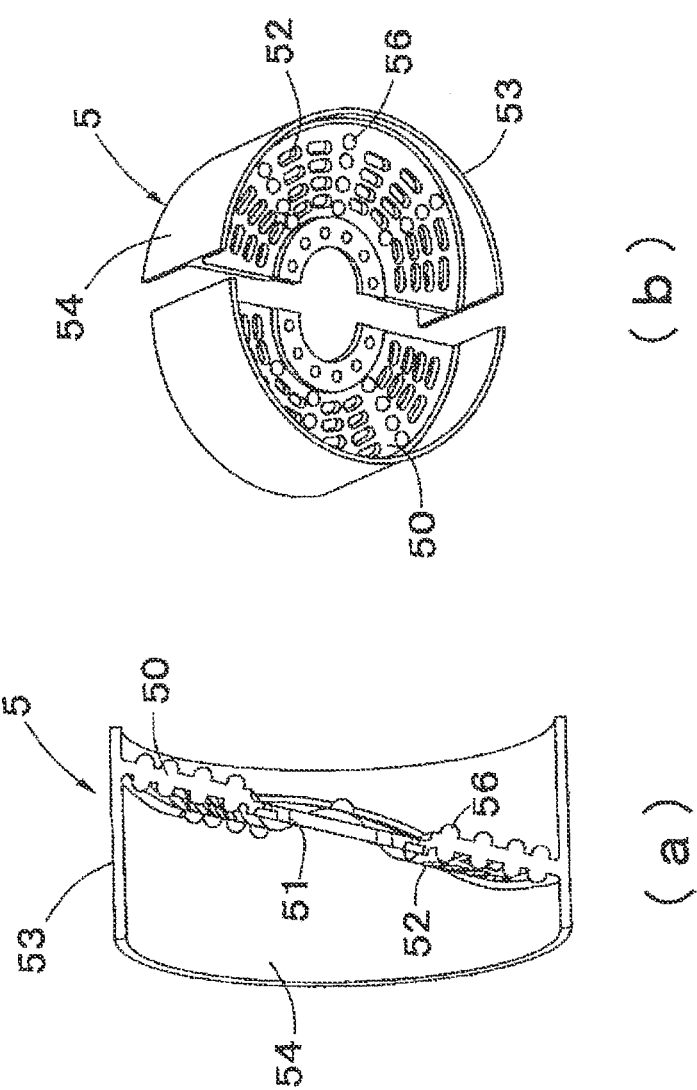
FIGS. 9(a) and 9(b) are drawings each showing a second alternative embodiment of the pressure-receiving member.

The pressure-receiving member (5) according to the fourth alternative embodiment includes the semidisc portion (50) and the flange portion (54), of which shapes are substantially the same as those of the semidisc portion (50) and the flange portion (54) of the pressure-receiving member (5) according to the second alternative embodiment shown in FIG. 9.

A difference between the pressure-receiving member (5) according to the fourth alternative embodiment and the pressure-receiving member (5) according to the second alternative embodiment is that the semidisc portions (50) in the two alternative embodiments are inclined in opposite directions with respect to a plane orthogonal to the central shaft (2).

In other words, the pressure-receiving member (5) according to the second alternative embodiment is inclined clockwise with respect to a plane orthogonal to the central shaft (2) while the pressure-receiving member (5) according to the fourth alternative embodiment is inclined counter-clockwise with respect to a plane orthogonal to the central shaft (2).

In either case where the pressure-receiving member (5) is inclined as in the second alternative embodiment or inclined as in the fourth alternative embodiment, a to-be-milled material(s) (a) is smoothly transferred. Thus, no adverse effect for the milling processing occurs.

Also in the case where the pressure-receiving member (5) according to the fourth alternative embodiment is used, it is preferable that the milling plate (4) is orthogonal to the central shaft (2). The milling plate (4) may have either a planar structure or a curved-surface structure. For example, the milling plate (4), which has substantially the same shape as that of the semidisc portion (50) of the pressure-receiving member (5) shown in FIG. 4, can be used.

As easily understood from the above-described alternative embodiments, structures or materials of the milling plate (4) and the semidisc portion (50) of the pressure-receiving member (5) may be the same. In addition, as for the milling plate (4) and the semidisc portion (50) of the pressure-receiving member (5) orthogonal to the central shaft (2) or inclined with respect to a plane orthogonal to the central shaft (2), either one of them or both of them may be inclined with respect to a plane orthogonal to the central shaft (2).

In addition, both of the milling plate (4) and the semidisc portion (50) of the pressure-receiving member (5) may not be necessarily inclined. However, it is preferable that there is at least a narrow space (Rm) where a to-be-milled material(s) (a) is held between the milling plate (4) and the pressure-receiving member (5).

All the above-described milling plates and the pressure-receiving members can be applied to the later-described second embodiment.

Next, an alternative embodiment of the entire structure of the mill will be described.

Figure 12:
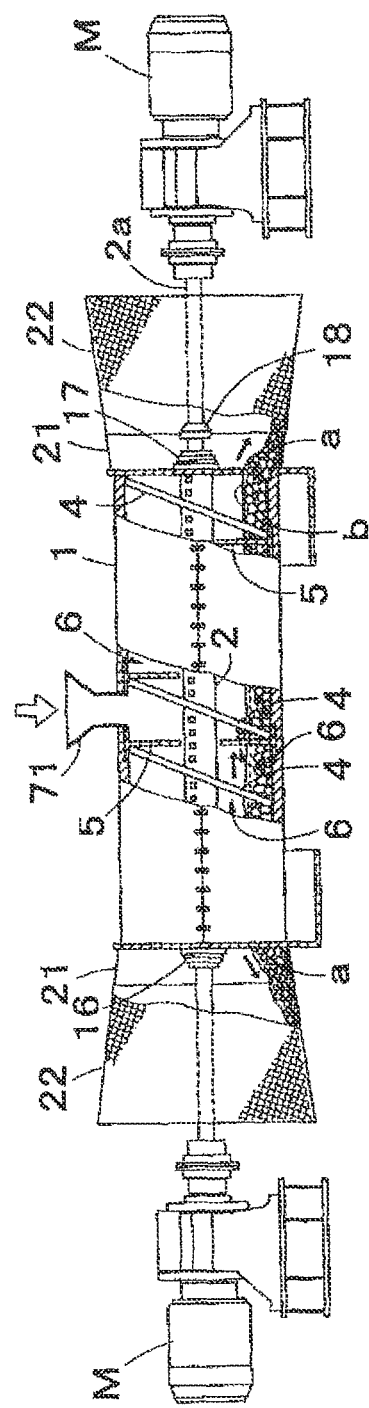
FIG. 12 is a partial cross sectional front view of the mill according to an alternative embodiment of the entire structure.

FIG. 12 is a partial cross sectional front view of the mill according to the alternative embodiment of the entire structure.

As shown in FIG. 12, the mill according to the present alternative embodiment includes the hopper (71) for putting in a to-be-milled material(s) (raw material(s)) provided at the central part of the drum body (1). It also includes discharge hoppers (21), sieve members (22), and motors (M) provided on the right and left sides of the drum body (1).

In addition, the mill according to the present alternative embodiment includes a sieve rotational shaft (2a) separated from the central shaft (2) in order to rotate one (on the right side in FIG. 12) of the sieve members (22). The central shaft (2) and the sieve rotational shaft (2a) are supported by a bearing member (18) so as to be rotatable with respect to each other.

It is noted that the sieve members (22) on both sides may be rotated together with the central shaft (2) by respectively connecting the motors (M) to both ends of the central shaft (2) and rotating the motors (M) on both sides in synchronization. In this case, the central shaft (2) and the sieve rotational shaft (2a) would be integrated.

According to the structure of the present alternative embodiment, processing capability can be significantly improved (by about twice) since a raw material(s) is put in from the central part of the drum body (1) and discharged from the sieve members on both sides.

Figure 13:
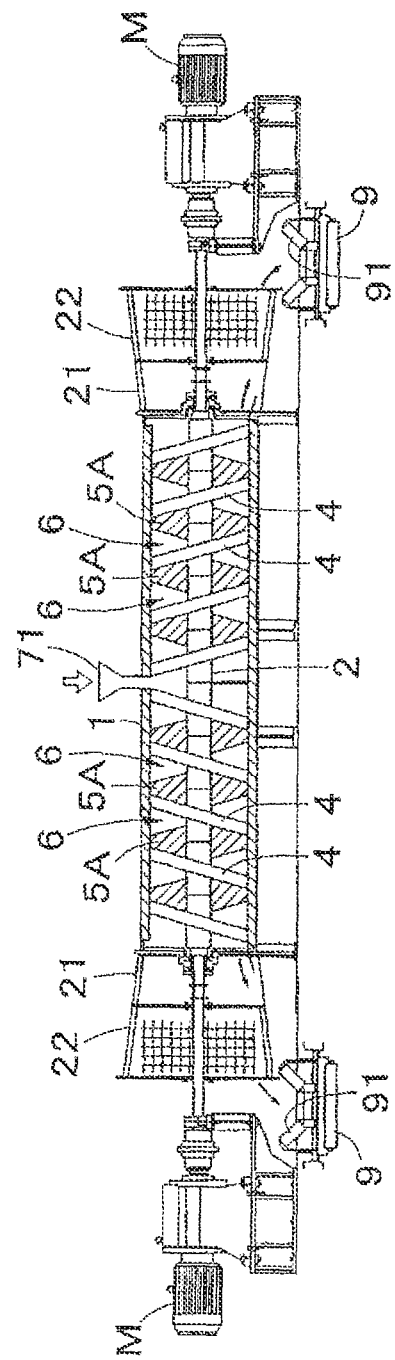
FIG. 13 is a cross sectional front view of a mill according to a second embodiment of the present invention.
Figure 14:
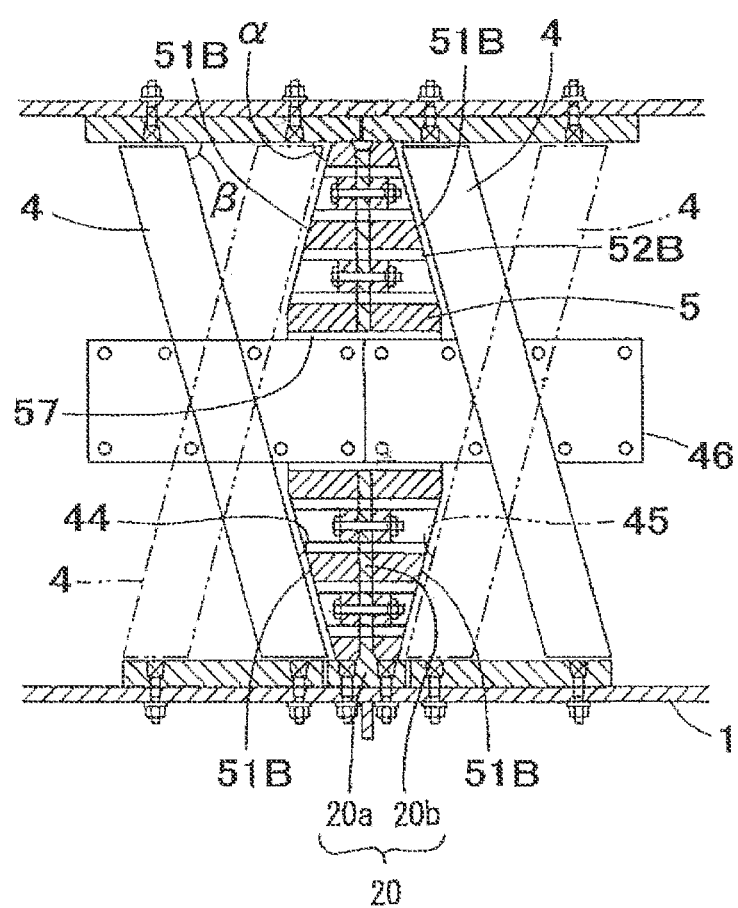
FIG. 14 is an enlarged view of a main part of the mill according to the second embodiment.

FIG. 13 is a cross sectional front view of a mill according to the second embodiment of the present invention. FIG. 14 is an enlarged view of a main part of the mill shown in FIG. 13.

Hereinafter, the difference between the configuration of the mill according to the second embodiment and that of the mill according to the above-described first embodiment will be described. It is noted that the same reference numerals are allotted to the members of the mill in the second embodiment which are the same as those in the above-described first embodiment.

The mill according to the second embodiment includes the hopper (71) for putting in a to-be-milled material(s) (raw material(s)) provided at the central part of the drum body (1). It also includes discharge hoppers (21), sieve members (22), and motors (M) provided on the right and left sides of the drum body (1).

On the downstream side of a sieve member (22), there is arranged a second delivery device (9) for receiving a to-be-milled material(s) each having a relatively large diameter which has not passed through a mesh of the sieve member (22) and thus has been delivered thereto. To the second delivery device (9), there is attached a second conveyor device (91) for delivering forward a to-be-milled material(s) with respect to the obverse side of the sheet of FIG. 13. Although not shown in FIG. 13, a guiding member for receiving a to-be-milled material(s) each having a relatively small diameter which has passed through the mesh of the sieve member (22); and a first delivery device arranged below the guiding member may be arranged below the sieve member (22).

A plurality of milling plates (4) each is provided in the axial direction of the central shaft at certain spacing, and partitions the internal space of the drum body (1) into a plurality of milling chambers (6) in the axial direction. Each of the milling plates (4) is inclined at an angle (β) with respect to a plane orthogonal to the central shaft (2) (see FIG. 15), and it rotates together with the central shaft (2).

In the embodiment shown in FIG. 13, the milling plates (4) are provided in substantially parallel with each other, but not limited to this. In the embodiment shown in FIG. 13, the milling plates (4) on the right side of the drum body (1) and those on the left side of the drum body (1) are inclined in the opposite directions, but they may be inclined in the same direction.

No milling medium (ball, etc.) for milling a to-be-milled material(s) is provided in the milling chambers (6).

A plurality of pressure-receiving members (5) each is arranged in a milling chamber (6), and it is orthogonal to the central shaft (2).

The pressure-receiving member (5) has an inclined plane (51B) which is inclined with respect to a plane orthogonal to the central shaft (2) such that a plane facing the milling plate (4) is in a substantially circular truncated cone shape. In another expression, the pressure-receiving member (5) has a piled-cone structure (a shape where bottoms of two cones (truncated cones) are put together), or an abacus's bead shape.

The inclined angle (α) of the inclined plane (51B) with respect to the central shall (2) is almost the same as the inclined angle (β) of the milling plate (4) with respect to the central shaft (2).

Since the milling plate (4) is inclined with respect to a plane orthogonal to the central shaft (2) and rotates together with the central shaft (2), the rotational movement of the milling plate (4) has an 8-like shaped trace. In other words, when the milling plate (4) rotates by 180 degrees from a position indicated by a solid line shown in FIG. 14, it moves to a position indicated by a phantom line (two-dot chain line). Then, the milling plate (4) rotates to move back to the position indicated by the solid line. The milling plate (4) keeps rotating such that it moves back and forth between the position indicated by the solid line and the position indicated by the phantom line.

Herein, since the inclined angle (α) of the inclined plane (51B) with respect to a place orthogonal to the central shall (2) is the same as the inclined angle (β) of the milling plate (4) with respect to a plane orthogonal to the central shaft (2), a surface of the milling plate (4) always faces the inclined plane (51B) of the pressure-receiving member (5) in parallel when the milling plate (4) rotates in a 8-like shaped trace. Specifically, when the milling plate (4) is located at the position indicated by the solid line in FIG. 14, a surface (44) of the milling plate (4) faces the inclined plane (51B) in parallel, and when the milling plate (4) is located at the position indicated by the phantom line in FIG. 14, a surface (45) of the milling plate (4) faces the inclined plane (51B) in parallel.

Thus, while the milling plate (4) is rotating, a to-be-milled material(s) is rubbed between the surface (44) or (45) of the milling plate (4) and the surface (inclined plane) of the pressure-receiving member (5). Since the milling plate (4) rotates in a 8-like shaped trace like a fan blade, effect of rubbing a to-be-milled material(s) four times between one pressure-receiving member (or two pressure-receiving members) (5) and two milling plates (or one milling plate) (4) occurs when the milling plate (4) rotates once, thereby significantly improving the milling efficiency.

Figure 15:
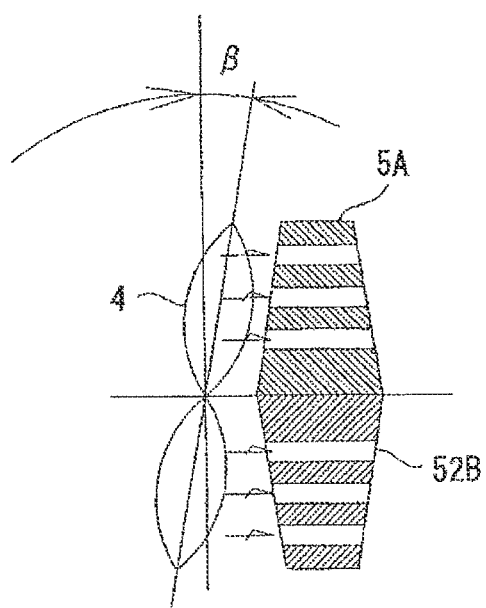
FIG. 15 is an image showing an operation of the mil according to the second embodiment.

In addition, the milling plate (4) generates wind as a fan does while rotating. FIG. 15 is an illustration of the milling plate (4) which is likened to a fan. The milling plate (4) generates wind as a fan does while rotating (see rightward arrows in FIG. 15) so as to allow easy transfer of a to-be-milled material(s) in the drum body. This especially enables easy pass of a to-be-milled material(s) through the through holes provided on the pressure-receiving member (5).

FIGS. 16(a) and 16(b) are drawings each showing the pressure-receiving member (5). FIG. 16(a) is a sectional view thereof. On the right side of FIG. 16(b), there is shown a cross sectional view of FIG. 16(a) taken along line A-A, and on the left side of FIG. 16(b), there is shown a cross sectional view of FIG. 16(a) taken along line B-B.

Figure 16:
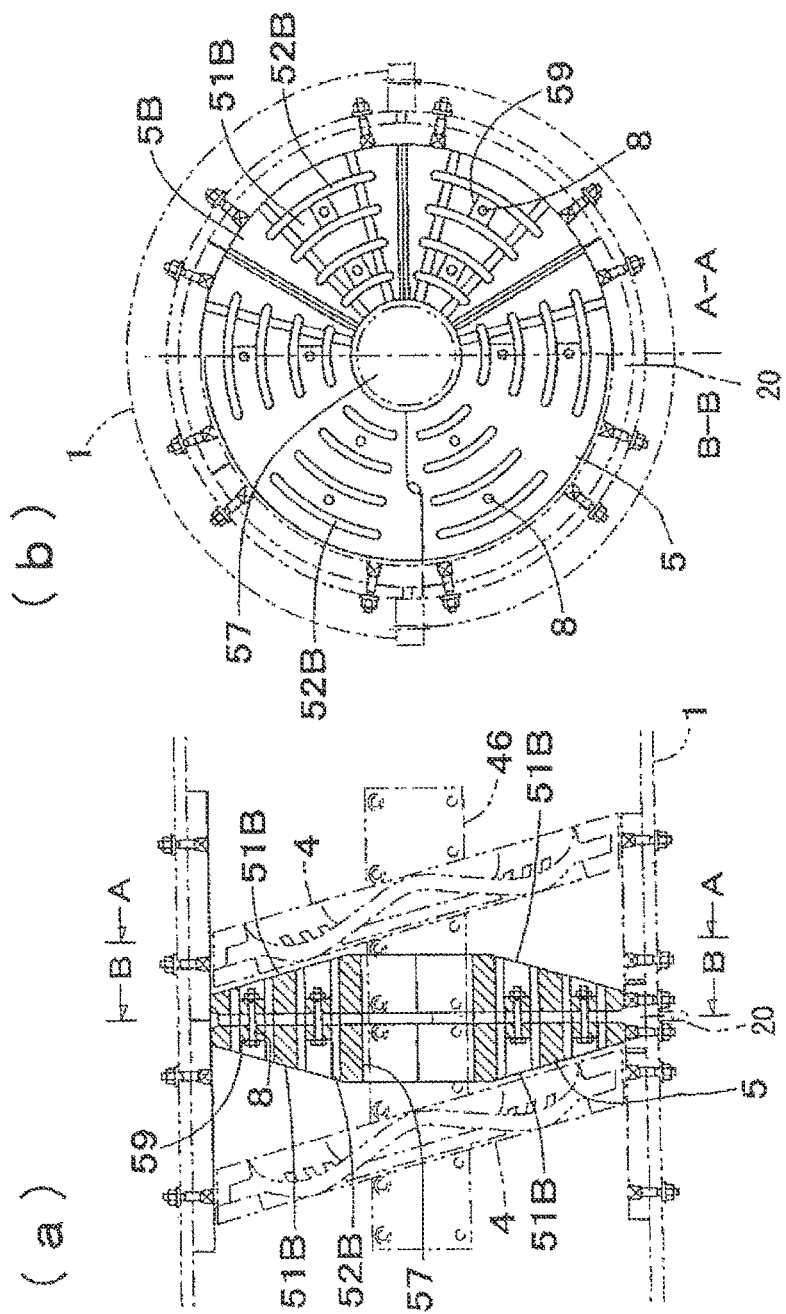
FIGS. 16(a) and 16(b) are drawings each showing a pressure-receiving member.

The pressure-receiving member (5) shown in FIG. 16 has a piled-cone structure shape in its front view or an abacus's bead shape in its front view as shown in FIG. 16(a). It is noted that "its front view" and "its side view" mean "the front view of the mill" and "the side view of the mill", respectively.

The pressure-receiving member (5) is attached to a mounting member (20) fixed to the inner surface of the drum body (1) so as to be fixed to the drum body (1).

The mounting member (20) includes: a fixed portion (20a) fixed by bolts to the bottom surface of the inner wall of the drum body (1); and a plate-like extending portion (20b) extending upward from this fixed portion (20a) and extending in a direction orthogonal to the central shaft (2). The upper end part of the extending portion (20b) extends to a vicinity of the top surface of the inner wall of the drum body (1).

Two members in a substantially semicircular shape (upper half member in a semicircular shape and lower half member in a semicircular shape) when viewed from the direction of the central shaft (2) are combined so that the pressure-receiving member (5) has a shape of circle. A central hole (57) into which the central shaft (2) is inserted is formed on a position corresponding to the central part of the circle.

A multiplicity of partially arc-shaped through holes (52B) arranged in a concentric circle is formed on the pressure-receiving member (5). The arc width of a through hole (52B) is set such that only a to-be-milled material(s) which has been milled to have less than a predetermined particle diameter in the milling chamber (6) can pass therethrough. The arc width of the through hole (52B) may be gradually decreased from the pressure-receiving member (5) on the upstream side of the drum body (1) toward the pressure-receiving member (5) on the downstream side thereof. A through hole and a central hole are also provided on the extending part (20b), and the shapes and arrangements of the through hole and the central hole of the extending part (20b) correspond with the shapes and arrangements of the through hole (52B) and the central hole (57), respectively.

A bolt insertion hole (58) is provided on the pressure-receiving member (5). A bolt is inserted in the bolt insertion hole (58) and fastened with a nut while the mounting member (20) is fitted in a slot provided in the pressure-receiving member (5) so that the pressure-receiving member (5) is fixed to the mounting member (20).

In the example of the figure, a plurality of deep holes is provided on the pressure-receiving member (5), and a spacer (59) having the bolt insertion hole and a shape thereof matching the deep hole is fitted into each deep hole. A bolt is inserted in the insertion hole and fastened with a nut while the mounting member (20) is held by a pair of spacers (59) so that the pressure-receiving member (5) is fixed to the mounting member (20). Thus, bolts and nuts do not protrude from a surface of the pressure-receiving member (5), thereby preventing the wearing of bolts and nuts caused by a to-be-milled material(s).

The pressure-receiving member (5) has a piled-cone structure shape in its front view or an abacus's bead shape in its front view as described above, and its thickness increases from its outer periphery edge toward the central hole (57). Thus, the pressure-receiving member (5) has the inclined plane (51B) which is inclined with respect to a plane orthogonal to the central shaft (2) such that a plane facing the milling plate (4) is in a substantially circular truncated cone shape.

Figure 17:
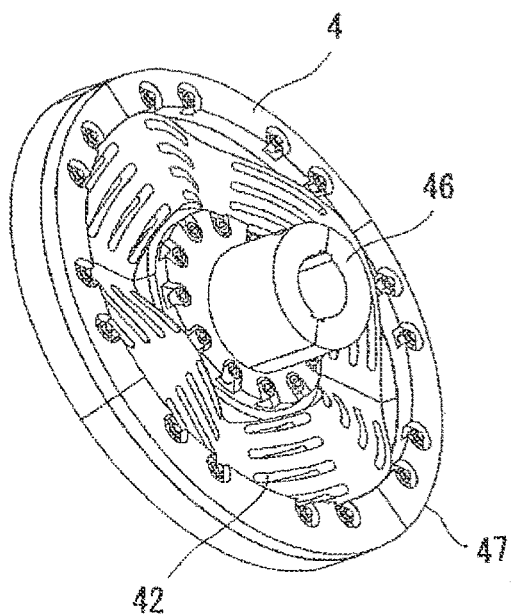
FIGS. 17(a) and 17(b) are drawings each showing a milling plate.
Figure 17:
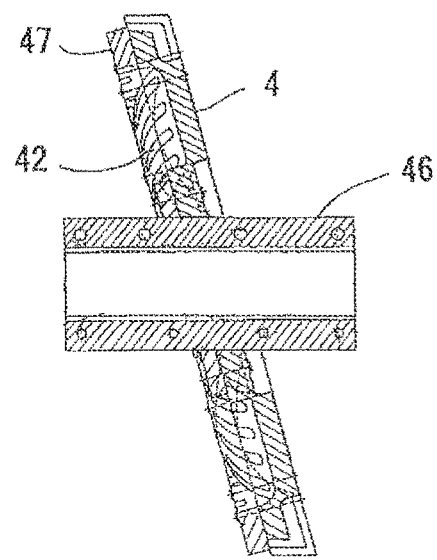

FIGS. 17(a) and 17(b) are drawings each showing an example of the milling plate according to the second embodiment, and FIG. 17(a) is a perspective view thereof, and FIG. 17(b) is a cross sectional view thereof.

The milling plate (4) has a substantially circular structure in which two semicircle curved plates are put together, and a cylindrical body (46) having a hole into which the central shaft (2) is inserted is fixed to the center of the milling plate (4). The cylindrical body (46) is fixed to the milling plate (4) while it is inclined with respect to the milling plate (4). Thus, when the cylindrical body (46) is attached to the central shaft (2), the milling plate (4) is attached to be inclined with respect to a plane orthogonal to the central shaft (2).

A plurality of partially arc-shaped through holes (42) arranged in a concentric circle is provided on the milling plate (4). The arc width of a through hole (42) is set such that only a to-be-milled material(s) which has been milled to have less than a predetermined particle diameter can pass therethrough. The arc width of the through hole (42) may be gradually decreased from the milling plate (4) on the upstream side of the drum body (1) toward the milling plate (4) on the downstream side thereof.

The milling plate (4) in the present embodiment has a wavy curved-surface structure in which peaks and valleys are iteratively provided at certain spacing in its circumferential direction. The wavy curved-surface structure means that a peak part on the obverse side is a valley part on the reverse side. In the example of the figure, the wavy curved-surface structure has four peaks and four valleys. In other words, four S-shaped planes are consecutively formed along with the circumferential direction. Thus, when the milling plate (4) rotates once, a to-be-milled material(s) is rubbed four times between one pressure-receiving member (or two pressure-receiving members) (5) and two milling plates (or one milling plate) (4).

The milling plate (4) may have a planar structure. In addition, the shape of the milling plate (4) may be elliptical instead of circular.

A circular member (47) is attached to the outer edge part of the milling plate (4) along the outer edge part.

Figure 18:
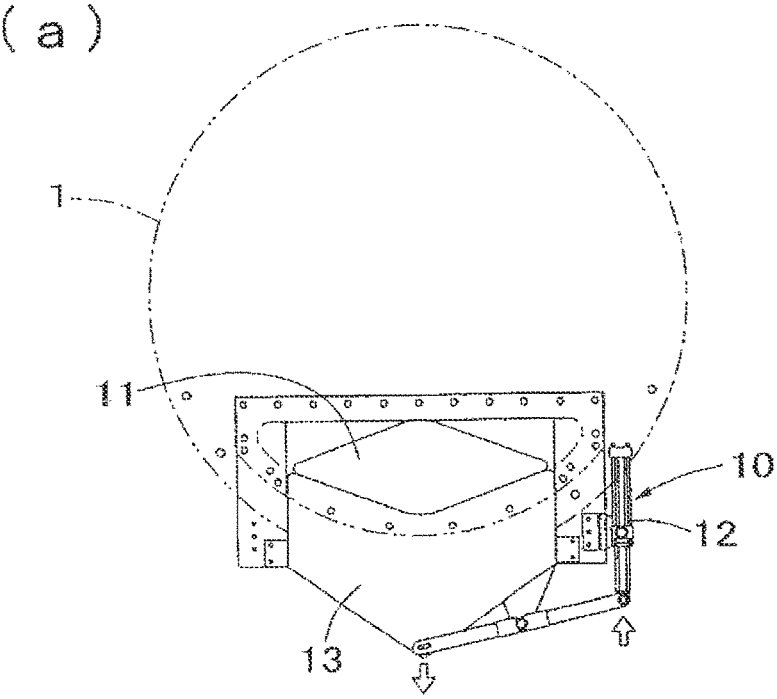
FIGS. 18(a) and 18(b) are drawings each showing a configuration of a discharge spout area changing mechanism.
Figure 18:
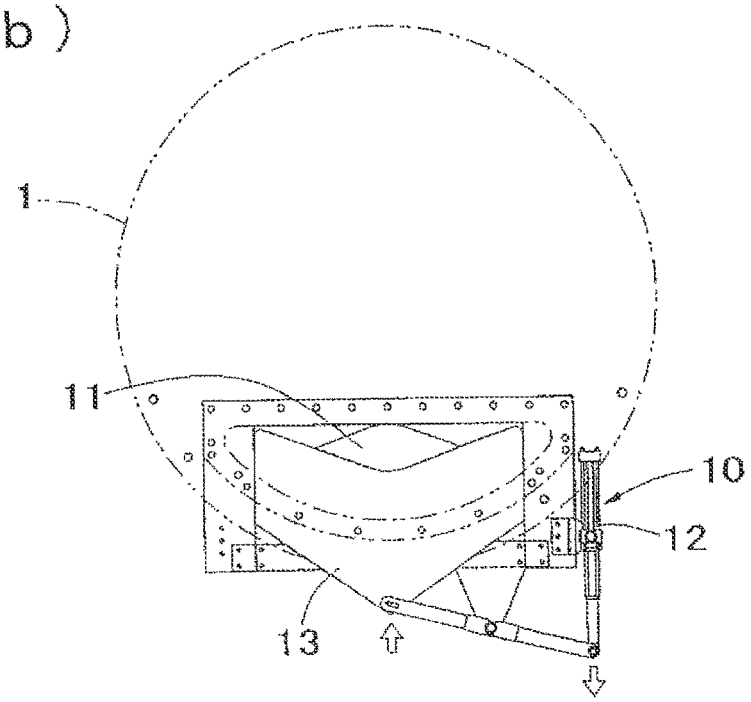

FIGS. 18(a) and 18(b) are drawings each showing a configuration of a discharge spout area changing mechanism, and FIG. 18(a) shows a state in which the area of the discharge spout is large, and FIG. 18(b) shows a state in which the area of the discharge spout is small.

The discharge spout area changing mechanism (10) changes the size of a discharge spout (11) for discharging a to-be-milled material(s) from the drum body (1).

The discharge spout (11) is provided on a position close to the lower part of the drum body (1) on each of the both ends of the drum body (1). A to-be-milled material(s) discharged from the discharge spout (11) is delivered to the sieve member (22).

The discharge spout area changing mechanism (10) includes: an oil hydraulic cylinder (12); and a cover plate (13) which reciprocally moves in accordance with expansion and contraction of a rod of the oil hydraulic cylinder (12).

When the rod of the oil hydraulic cylinder (12) contracts, the cover plate (13) moves downward, and the area (area not covered with the cover plate (13)) of the discharge spout (11) becomes larger as shown in FIG. 18(a). When the rod of the oil hydraulic cylinder (12) expands, the cover plate (13) moves upward, and the area (area not covered with the cover plate (13)) of the discharge spout (11) becomes smaller as shown in FIG. 18(b).

Thus, residence time (milling processing time) of a to-be-milled material(s) in the drum body is adjusted by adjusting the area of the discharging spout (11). This achieves an appropriate milling processing according to a type of to-be-milled material.

In the present invention, the pressure-receiving member (5) in the mill can be removed.

If the pressure-receiving member is removed, the milling efficiency may decrease compared with the case where the pressure-receiving member is used. However, a to-be-milled material(s) is rubbed by the inner surface of the drum body or a surface of the milling plate to be milled, or to-be-materials are rubbed with each other to be milled.

In this case, in order to improve the milling efficiency, it is preferable that an arrangement interval (pitch) between milling plates is smaller compared with the case where the pressure-receiving member is used.

EXAMPLES

Hereinafter, examples of the present invention will be shown in order to more clarify the effects of the present invention. However, the present invention is not limited to the following examples.

<Manufacture of Recycled Aggregate for Concrete>

The above-described manufacturing method 1 (see FIGS. 1 and 2) was employed to manufacture recycled aggregate for concrete using concrete debris as raw material, which is made of: the first raw material (sandstone based raw material) generated as a result of demolition of a concrete structure; and the second raw material (lime based raw material) made of returned ready-mixed concrete.

The volume ratio between the large diameter components (10-25 mm) and the small diameter components (0-10 mm) to be provided to the post-processing step was set at 100:0, 50:50, 70:30, 30:70, and 0:100 of five patterns, respectively.

The volume ratio between the first raw material and the second raw material supplied to the first mill (119) in the post-processing step 2 was set as 50:50, and recycled coarse aggregate (RHG 2005) made up of the large diameter components (5-20 mm) and recycled fine aggregate (RHS) made up of the small diameter components (0-5 mm) were collected as resultant product.

The mill (mill according to the first embodiment) which has the structure shown in FIG. 3 was used as the first mill (119) and the second mill (124). Specifically, "Super Gaos 1300" (product name: made by DAITO DOBOKU Ltd.) was used as the first mill (119), and "Super Gaos 500" (product name: made by DAITO DOBOKU Ltd.) was used as the second mill (124). The conditions of each of the mills are shown in Table 1.

TABLE 1

|  | First mill | Second mill |
|---|---|---|
| Number of rotations (r.p.m.) | 30 | 30 |
| Processing speed (t/h) | 24 | 25 |
| Radius of Drum body (m) | 0.65 | 0.25 |

<Quality Evaluation Test 1 on Recycled Aggregate>

First, in the case where the reprocessing step in the post-processing step 3 of the post-processing step (FIG. 2) was performed once, the quality evaluation test based on JIS A 5021 was carried out on the collected recycled coarse aggregate (RHG 2005) made up of the large diameter components and the collected recycled fine aggregate (RHS) made up of the small diameter components. The result about the large diameter components is shown in Table 2, and the result about the small diameter components is shown in Table 3.

It is noted that although the results of the cases where the volume ratio between the large diameter components (10-25 mm) and the small diameter components (0-10 mm) is set at 100:0 and 0:100 are not shown in Table 2, the collected recycled aggregate in both cases did not correspond to the quality classification H stipulated in JIS A 5021. In the former case, the collected recycled aggregate contained much gravel and little sand, the particle diameter of the collected recycled aggregate was large, and the collected recycled aggregate corresponded to the quality classification M stipulated in JIS A 5021. In the latter case, the collected recycled aggregate contained much sand, and it was confirmed with eyes that much cement paste adhered to the surface of the collected recycled aggregate.

TABLE 2

| Input ratio | | Absolute dry density | Water absorption | FM value (Fineness | Quality classification in JIS |
|---|---|---|---|---|---|
| 10-25 mm | 0-10 mm | (g/cm³) | (%) | modulus) | A 5021 |
| 50 | 50 | 2.58 | 1.08 | 6.68 | H |
| 70 | 30 | 2.58 | 0.81 | 6.59 | H |
| 30 | 70 | 2.50 | 1.38 | 6.63 | H Absolute dry density is close to M |

TABLE 3

| Input ratio | | Absolute dry density | Water absorption | FM value (Fineness | Quality classification in JIS |
|---|---|---|---|---|---|
| 10-25 mm | 0-10 mm | (g/cm³) | (%) | modulus) | A 5021 |
| 50 | 50 | 2.56 | 2.20 | 3.07 | H |
| 70 | 30 | 2.63 | 1.25 | 2.88 | H |
| 30 | 70 | 2.48 | 2.89 | 3.37 | Absolute dry density corresponds to M |

<Quality Evaluation Test 2 on Recycled Aggregate>

Next, in the case where the reprocessing step in the post-processing step 3 of the post-processing step (FIG. 2) was performed twice, the quality evaluation test based on JIS A 5021 was carried out on the collected recycled coarse aggregate (RHG 2005) made up of the large diameter components and the collected recycled fine aggregate (RHS) made up of the small diameter components. The result about the large diameter components is shown in Table 4, and the result about the small diameter components is shown in Table 5.

It is noted that the volume ratio between the large diameter components (10-25 mm) and the small diameter components (0-10 mm) provided to the post-processing step was set as 50:50.

TABLE 4

| Input ratio | | Absolute dry density | Water absorption | FM value (Fineness | Quality classification in JIS |
|---|---|---|---|---|---|
| 10-25 mm | 0-10 mm | (g/cm$^3$) | (%) | modulus) | A 5021 |
| 50 | 50 | 2.59 | 0.91 | 6.65 | H |

TABLE 5

| Input ratio | | Absolute dry density | Water absorption | FM value (Fineness | Quality classification in |
|---|---|---|---|---|---|
| 10-25 mm | 0-10 mm | (g/cm$^3$) | (%) | modulus) | JIS A 5021 |
| 50 | 50 | 2.60 | 1.59 | 2.85 | H |

According to the above-described quality evaluation tests 1 and 2, it was confirmed that high quality recycled aggregate could be collected: by performing the milling step which employed a mill without a milling medium; by performing the reprocessing step at least once or more; and by setting the volume of the large diameter components to be provided to the post-processing step larger than the volume of the small diameter components, wherein the collected recycled aggregate has absolute dry density of 2.5 g/cm$^3$ or greater and water absorption of 3.0% or smaller and corresponds to the quality classification H stipulated in JIS A 5021. In addition, it was confirmed that higher quality recycled aggregate could be collected by performing the reprocessing step twice or more.

In the case where the mill (mill according to the second embodiment) which has the structure shown in FIG. 13 is used as the first mill (119) and the second mill (124), it is considered that higher quality recycled aggregate can be collected since the cement paste adhering to aggregate can be more certainly removed.

INDUSTRIAL APPLICABILITY

The present invention is utilized for manufacturing high quality recycled aggregate from concrete debris as raw material.

REFERENCE NUMERALS LIST

1 Drum body
2 Central shaft
4 Milling plate
5 Pressure-receiving member
6 Milling chamber
119 First mill (Mill)
124 Second mill

The invention claimed is:

1. A method for manufacturing recycled aggregate, comprising step of:
   (i) crushing a raw material consisting essentially of concrete debris so as to have a predetermined particle diameter;
   (ii) classifying the raw material crushed in the step (i) into small diameter components having a first particle diameter and large diameter components having the first particle diameter;
   (iii) supplying the large diameter components and the small diameter components classified in the step (ii) to a mill with a ratio such that a volume of the large diameter components is larger than that of the small diameter components and rubbing the large diameter components and the small diameter components with each other at the mill;
   (iv) classifying the large diameter components and the small diameter components milled in the step (iii) into small diameter components having a second particle diameter and large diameter components having the second particle diameter, the second particle diameter being smaller than the first particle diameter; and
   (v) supplying the large diameter components and the small diameter components classified in the step (iv) to the mill and sequentially performing the step (iii) and the step (iv), wherein after the step (iv) is performed at least once, the large diameter components and the small diameter components classified in the step (iv) in a last-performed step (v) are collected as recycled aggregate.

2. A method for manufacturing recycled aggregate, comprising step of:
   (i) crushing a raw material consisting essentially of concrete debris so as to have a predetermined particle diameter;
   (ii) classifying the raw material crushed in the step (i) into small diameter components having a first particle diameter and large diameter components having the first particle diameter;
   (iii-1) supplying the large diameter components and the small diameter components classified in the step (ii) to a first mill with a ratio of such that a volume of the large diameter components is larger than that of the small diameter components and rubbing the large diameter components and the small diameter components with each other at the first mill;
   (iv) classifying the large diameter components and the small diameter components milled in the step (iii-1) into small diameter components having a second particle diameter and large diameter components having the second particle diameter, the second particle diameter being smaller than the first particle diameter;
   (iii-2) supplying the small diameter components classified in the step (iv) to a second mill and rubbing the small diameter components each other at the second mill; and
   (v) supplying the large diameter components classified in the step (iv) and the small diameter components milled in the step (iii-2) to the first mill and sequentially performing the step (iii-1), the step (iv), and the step (iii-2), wherein after the step (v) is performed at least once, the large diameter components classified in the step (iv) and the small components milled in the step (iii-2) in a last-performed step (v) are collected as recycled aggregate.

3. The method for manufacturing recycled aggregate according to claim 1 or 2, wherein the raw material consisting essentially of:
   a first raw material generated as a result of demolition of a concrete structure; and a second raw material made of returned ready-mixed concrete, and a ratio (volume ratio) of the second raw material to the entire raw material is set at least 30%.

4. The method for manufacturing recycled aggregate according to claim 1 or 2, wherein the step (v) is performed at least twice.

5. Recycled aggregate obtained by the manufactured method according to claim 1 or 2, wherein the recycled aggregate has absolute dry density of no less than 2.5 g/cm$^3$ and water absorption of not more than 3.0%.

6. The method for manufacturing recycled aggregate according to claim 1, wherein said mill is composed of:
- a cylindrical drum body configured such that materials to be milled taken in from one part thereof can be discharged from the other part thereof;
- a central shaft penetrating the drum body in the cylinder lengthwise direction thereof; and
- a plurality of milling plates which are attached to the drum body at predetermined spacing in the axial direction of the central shaft and which partitions the internal space of the drum body into a plurality of milling chambers.

7. The method for manufacturing recycled aggregate according to claim 2, wherein said first mill and said second mill are composed of:
- a cylindrical drum body configured such that materials to be milled taken in from one part thereof can be discharged from the other part thereof;
- a central shaft penetrating the drum body in the cylinder lengthwise direction thereof; and
- a plurality of milling plates which are attached to the drum body at predetermined spacing in the axial direction of the central shaft and which partitions the internal space of the drum body into a plurality of milling chambers.

\* \* \* \* \*